(12) United States Patent
Wang

(10) Patent No.: US 12,614,987 B2
(45) Date of Patent: Apr. 28, 2026

(54) PULSE WIDTH MODULATION METHOD AND SYSTEM

(71) Applicant: Delta Electronics (Shanghai) Co., Ltd., Shanghai (CN)

(72) Inventor: Xiaolei Wang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 277 days.

(21) Appl. No.: 18/525,860

(22) Filed: Dec. 1, 2023

(65) Prior Publication Data

US 2024/0405688 A1 Dec. 5, 2024

(30) Foreign Application Priority Data

May 31, 2023 (CN) .......................... 202310634714.7

(51) Int. Cl.
| | |
|---|---|
| *H02M 3/335* | (2006.01) |
| *H02M 1/08* | (2006.01) |
| *H02M 3/00* | (2006.01) |
| *H02M 1/00* | (2006.01) |

(52) U.S. Cl.
CPC ......... *H02M 3/33573* (2021.05); *H02M 1/08* (2013.01); *H02M 3/01* (2021.05); *H02M 3/33584* (2013.01); *H02M 1/0058* (2021.05)

(58) Field of Classification Search
CPC .. H02M 3/33573; H02M 3/01; H02M 1/0058; H02M 1/0043; H02M 1/0054; H02M 1/32; H02M 3/33569; H02M 1/385
See application file for complete search history.

(56) References Cited

U.S. PATENT DOCUMENTS

| | | | | | |
|---|---|---|---|---|---|
| 10,819,244 | B1 * | 10/2020 | Shi | .................... | H02M 3/33569 |
| 11,025,172 | B2 * | 6/2021 | Zhang | .................... | H02M 3/01 |
| 11,063,523 | B2 * | 7/2021 | Hu | .......................... | H02M 1/15 |
| 11,190,104 | B2 * | 11/2021 | Hu | ................... | H02M 3/33523 |
| 11,283,365 | B2 * | 3/2022 | Sigamani | .......... | H02M 3/33571 |

(Continued)

FOREIGN PATENT DOCUMENTS

CN 112511007 B 9/2022

OTHER PUBLICATIONS

Dong Liu et al., "Periodically Swapping Modulation (PSM) Strategy for Three-Level (TL) DC/DC Converters With Balanced Switch Currents," IEEE Transactions on Industrial Electronics, vol. 65, No. 1, Jan. 2018.

*Primary Examiner* — Kyle J Moody
(74) *Attorney, Agent, or Firm* — CKC & Partners Co., LLC

(57) ABSTRACT

The present disclosure provides a pulse width modulation method, which is applied to a bridge circuit, comprising: configuring a first driving mode and a second driving mode of the pulse width modulation of the bridge circuit, wherein losses of the same switch of the bridge circuit in the first driving mode and the second driving mode are reversed; in a first time window, controlling the bridge circuit to operate in the first driving mode, wherein the first time window is M switching cycles, and M is a positive integer; and in a second time window, controlling the bridge circuit to operate in the second driving mode, wherein the second time window is N switching cycles, N is a positive integer, and the pulse width modulation process of the bridge circuit is divided into the first time window and the second time window that are alternated cyclically.

18 Claims, 15 Drawing Sheets

(56) References Cited

U.S. PATENT DOCUMENTS

| | | | |
|---|---|---|---|
| 11,855,529 B2 * | 12/2023 | Mantooth | H02M 3/01 |
| 11,901,826 B2 * | 2/2024 | Zhang | G01R 19/175 |
| 12,101,024 B2 * | 9/2024 | Liu | H02M 3/158 |
| 12,362,664 B2 * | 7/2025 | Castro Alvarez | H02M 3/33573 |
| 2020/0266719 A1 * | 8/2020 | Oh | H02M 7/5387 |
| 2021/0359611 A1 * | 11/2021 | Zhou | H02M 3/33573 |

* cited by examiner

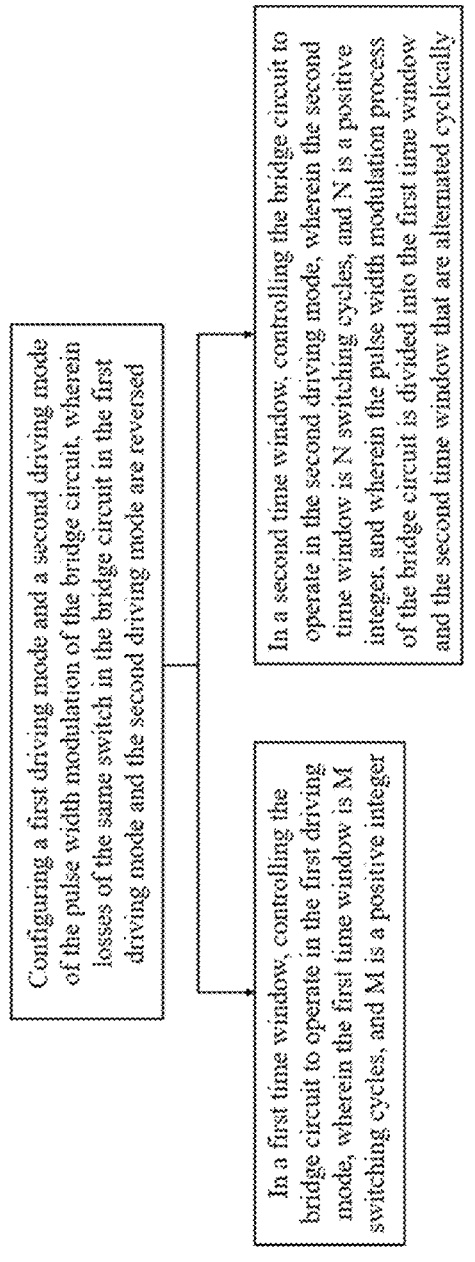

Configuring a first driving mode and a second driving mode of the pulse width modulation of the bridge circuit, wherein losses of the same switch in the bridge circuit in the first driving mode and the second driving mode are reversed In a first time window, controlling the bridge circuit to operate in the first driving mode, wherein the first time window is M switching cycles, and M is a positive integer In a second time window, controlling the bridge circuit to operate in the second driving mode, wherein the second time window is N switching cycles, and N is a positive integer, and wherein the pulse width modulation process of the bridge circuit is divided into the first time window and the second time window that are alternated cyclically

Fig. 1

PULSE WIDTH MODULATION METHOD AND SYSTEM

CROSS REFERENCE TO RELATED APPLICATION

This application claims the benefit of priority to Chinese Application No. 202310634714.7, filed on May 31, 2023, the content of which is incorporated herein by reference in its entirety.

BACKGROUND OF THE PRESENT DISCLOSURE

1. Field of the Present Disclosure

The present disclosure relates to the technical field of switching mode power supply, and particularly to a pulse width modulation method and system.

2. Related Art

Switching mode power supplies shall keep balance of losses in bridge circuit and filter capacitor in design as could as possible, and taking the bridge circuit (full bridge or half bridge) for example, if loss of each switch is consistent, it is possible to select devices of same model and the same heat dissipation way, which can effectively reduce cost of the system and complexity of the design in application.

As for the switching mode power supplies having some specific topologies, for example, series half bridge, flying capacitor half bridge or three-phase CLLC topology, gains can be changed by changing a duty cycle. However, the traditional modulation way makes losses in the switches of the bridge circuit imbalanced.

To sum up, the existing method has many issues in actual use, so it is necessary to make improvement.

SUMMARY OF THE PRESENT DISCLOSURE

With respect to the deficiencies, an object of the present disclosure is to provide a pulse width modulation method and system, which can balance losses in switches in the bridge circuit, such that losses in devices of the switches are substantially consistent, thereby reducing cost of the system.

In order to achieve the object, the present disclosure provides a pulse width modulation method, which is applied to a bridge circuit, comprising:

configuring a first driving mode and a second driving mode of the pulse width modulation of the bridge circuit, wherein losses of the same switch in the bridge circuit in the first driving mode and the second driving mode are reversed;

in a first time window, controlling the bridge circuit to operate in the first driving mode, wherein the first time window is M switching cycles, and M is a positive integer; and in a second time window, controlling the bridge circuit to operate in the second driving mode, wherein the second time window is N switching cycles, N is a positive integer, and the pulse width modulation process of the bridge circuit is divided into the first time window and the second time window that are alternated cyclically.

In addition, the present disclosure further provides a pulse width modulation system, comprising a bridge circuit and a controller, wherein the controller configures a first driving mode and a second driving mode of the pulse width modulation of the bridge circuit, wherein losses of the same switch in the bridge circuit in the first driving mode and the second driving mode are reversed; in a first time window, controls the bridge circuit to operate in the first driving mode, wherein the first time window is M switching cycles, and M is a positive integer; and in a second time window, controls the bridge circuit to operate in the second driving mode, wherein the second time window is N switching cycles, and N is a positive integer, and wherein the pulse width modulation process of the bridge circuit is divided into the first time window and the second time window that are alternated cyclically.

The pulse width modulation method and system according to the present disclosure use different driving modes among different time windows. By swapping the bridge circuit to operate in the corresponding driving mode in the specified time window, losses in devices of the switches are reversed when the driving modes are switched, thereby achieving thermal balance of all switches.

BRIEF DESCRIPTION OF THE DRAWINGS

These and additional features and advantages of the present disclosure will be more apparent in view of the following detailed description of the exemplary embodiments with reference to the drawings, in which:

FIG. 1 is a flow diagram of steps of the pulse width modulation method according to an embodiment of the present disclosure.

DETAILED EMBODIMENTS OF THE PRESENT DISCLOSURE

Figure 2:
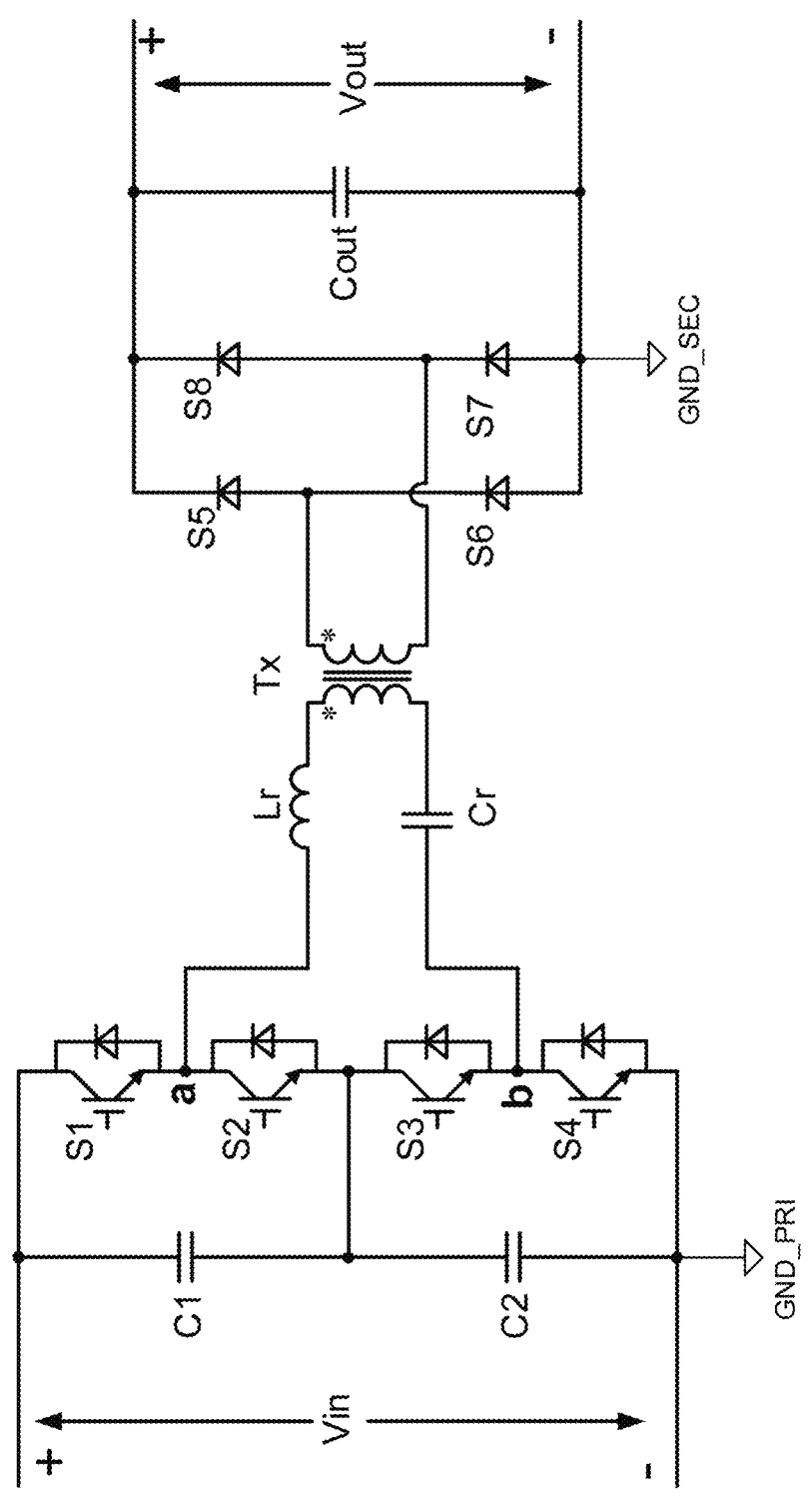
FIG. 2 is a topological diagram of a series half bridge resonant circuit.

Exemplary embodiments will now be described more fully with reference to the accompanying drawing. However, the exemplary embodiments may be implemented in many forms and should not be construed as limited to the embodiments set forth herein. On the contrary, these exemplary embodiments are provided so that this disclosure will be comprehensive and complete, and the conception of exemplary embodiments will be fully conveyed to those skilled in the art. In the drawings, the same reference numerals indicate the same or similar structures, and thus repeated descriptions thereof will be omitted.

To make the object, technical solution and advantage of the present disclosure clearer, hereinafter the present disclosure is further explained in details with reference to the accompanying drawings and the embodiments. It shall be understood that the described specific embodiments are only to explain the present disclosure, not limiting the present disclosure.

It shall be noted that citations of "one embodiment", "embodiments" and "exemplary embodiments" in the specification refer to that the described embodiment(s) may comprise specific features, structures or properties, but not each embodiment must comprise these specific features, structures or properties. Moreover, such expression does not refer to the same embodiment. Further, when the specific features, structures or properties are described with reference to the embodiments, no matter whether there is clear description, it has indicated that such feature, structure or property combined with other embodiments is within knowledge range of those skilled in the art.

In addition, the specification and subsequent claims use some phrases to refer to specific assembly or component, and those ordinary in the art shall understand that manufacturers may name the same assembly or component using different nouns or terms. The specification and subsequent claims do not distinguish the assembly or component with difference of names, but using difference of functions of the assembly or component as the distinguishing criterion. "Comprise" and "include" mentioned in the whole specification and subsequent claims are open words, so they shall be understood to be "include but not limited to". Moreover, the word "connection" includes any direct or indirect electrical connection means. Indirect electrical connection means comprises connecting through other devices.

FIG. 1 shows a pulse width modulation method according to an embodiment of the present disclosure, and the method is applied to a bridge circuit, comprising:

S101: configuring a first driving mode and a second driving mode of the pulse width modulation of the bridge circuit, wherein losses of the same switch in the bridge circuit in the first driving mode and the second driving mode are reversed. That is, the same switch produces a first loss in the first driving mode of the pulse width modulation, and produces a second loss in the second driving mode of the pulse width modulation, and the first loss and the second loss are mutually high and low losses. For example, the first loss is higher than the second loss, or the first loss is lower than the second loss. The first driving mode and the second driving mode refer to modes that control driving operation of the bridge circuit using different pulse width modulation driving signals, i.e., the first driving mode and the second driving mode correspond to different pulse width modulation driving signals, respectively. In this embodiment, losses of all switches in the bridge circuit in the first driving mode and the second driving mode are different.

S102: In a first time window, controlling the bridge circuit to operate in the first driving mode, wherein the first time window is M switching cycles, and M is a positive integer; and S103: In a second time window, controlling the bridge circuit to operate in the second driving mode, wherein the second time window is N switching cycles, N is a positive integer, and the pulse width modulation process of the bridge circuit is divided into the first time window and the second time window that are alternated cyclically.

In this embodiment, the pulse width modulation process of the bridge circuit is a process in which the first time window and the second time window are alternately connected, where the first time window is M switching cycles, and the second time window is N switching cycles. If the current time node is a start point of the first time window, the bridge circuit is controlled to operate in a preset first driving mode, specifically, driving the bridge circuit to operate using pulse width modulation driving signal corresponding to the first driving mode, and when the current time node is an end point of the first time window, and enters into a second time window, i.e., the end point of the first time window overlaps a start point of the second time window, the bridge circuit is controlled to operate in a preset second driving mode, specifically, driving the bridge circuit to operate using pulse width modulation driving signal corresponding to the second driving mode. Since the whole the pulse width modulation process of the bridge circuit is alternative connection of the first time window and the second time window, the bridge circuit is specifically switched from the first driving mode to the second driving mode after operating M switching cycles in the first driving mode, and then switched back to the first driving mode after operating N switching cycles in the second driving mode. That is, this embodiment drives the bridge circuit to operate alternately using the pulse width modulation driving signals corresponding to the first driving mode and the second driving mode, such that all switches in the bridge circuit work using the pulse width modulation driving signals corresponding to the first driving mode and the second driving mode, and there is a high-low difference inversion for any switch between the first loss in the first driving mode and the second loss in the second driving mode, so loss of one switch in the first driving mode is high, and in the second driving mode the loss of same switch is low, or loss of one switch in the first driving mode is low, and in the second driving mode the loss of same switch is high loss. Considering that heat of devices is an accumulated process along with temperature, if the switch A is high loss, and the switch B is low loss in the first time window, in the second time window, the switch A is low loss, and the switch B is high loss. Losses among different switches tend to balance using alternating switch of the first driving mode and the second driving mode corresponding to the first time window and the second time window, i.e., when viewing from the averaging losses, loss of the switch A and loss of the switch B have a thermal balance. This embodiment can alternately switch operation in the first driving mode and the second driving mode, such that all switches of the bridge circuit finally achieve thermal balance, and losses in devices of each switch are consistent, thereby reducing cost of the system.

Moreover, usage of DSP computing resource can be reduced to the maximum extent through the modulation way of swapping between the first driving mode and the second driving mode of the bridge circuit. For example, if a switching frequency of the switching mode power supply is 100 kHz, generally, DSP also designs a fast interrupt frequency to be 100 kHz, thereby facilitating cycle-by-cycle protection and loop computation. Using the modulation way of this embodiment, DSP can additionally configure one, such as, 1 kHz slow interrupt, such that the modulation way is switched once every 100 fast interrupts, and usage of DSP computing resource may be effectively reduced through the slow interrupt. As for one switch, losses before and after swapping are inconsistent, but a junction temperature of semiconductors approaches one constant value, fluctuation is quite small, and a total loss generated within a 1 ms period is very small.

In one embodiment of the present disclosure, the M switching cycles of the first time window are equal to the N switching cycles of the second time window, for example, M and N are both equal to 2. Of course, M and N also can be other equal positive integers. Alternatively, M and N may be relatively close integers, and specifically, may be configured according to actual usage scenarios, and M and N being equal or close values enables all switches of the bridge circuit to achieve thermal balance.

The switches of the bridge circuit, for example, comprise controllable switches and/or uncontrollable switches, the uncontrollable switches are, such as, silicon diodes or silicon carbide diodes, and the controllable switches are, such as, IGBTs, Si Mosfets, SiC Mosfets, GaNs, or the like.

Referring to FIG. 2, in the first example, the bridge circuit, for example, is a series half bridge resonant circuit comprising an inverter bridge and a resonant tank, the inverter bridge comprising an upper half bridge and a lower half bridge that are connected in series, the upper half bridge comprising a first bridge arm comprising a first switch S1 and a second switch S2 that are sequentially connected in series, and a first capacitor C1 connected in parallel to the first bridge arm; and the lower half bridge comprising a second bridge arm comprising a third switch S3 and a fourth switch S4 that are sequentially connected in series, and a second capacitor C2 connected in parallel to the second bridge arm; in the first driving mode and the second driving mode, pulse width modulation driving signal for the first switch S1 and pulse width modulation driving signal for the second switch S2 are complementary to each other, pulse width modulation driving signal for the third switch S3 and pulse width modulation driving signal for the fourth switch S4 are complementary to each other, with a difference of 180° between the phases of the pulse width modulation driving signals for the first switch S1 and the third switch S3. The resonant tank in FIG. 2 comprises a resonant inductor Lr and a resonant capacitor Cr, the resonant tank has one end connected to a point a between the first switch S1 and the second switch S2, and the other end connected to a point b between the third switch S3 and the fourth switch S4, a voltage source of the inverter bridge is Vin, and an output is an excitation source Vab. A primary side circuit of the bridge circuit comprises the resonant tank and the inverter bridge, and a secondary side circuit of the bridge circuit comprises a full bridge rectifier circuit comprising a rectifier bridge (consisting of diodes S5 to S8) and an output capacitor Cout.

Figure 3:
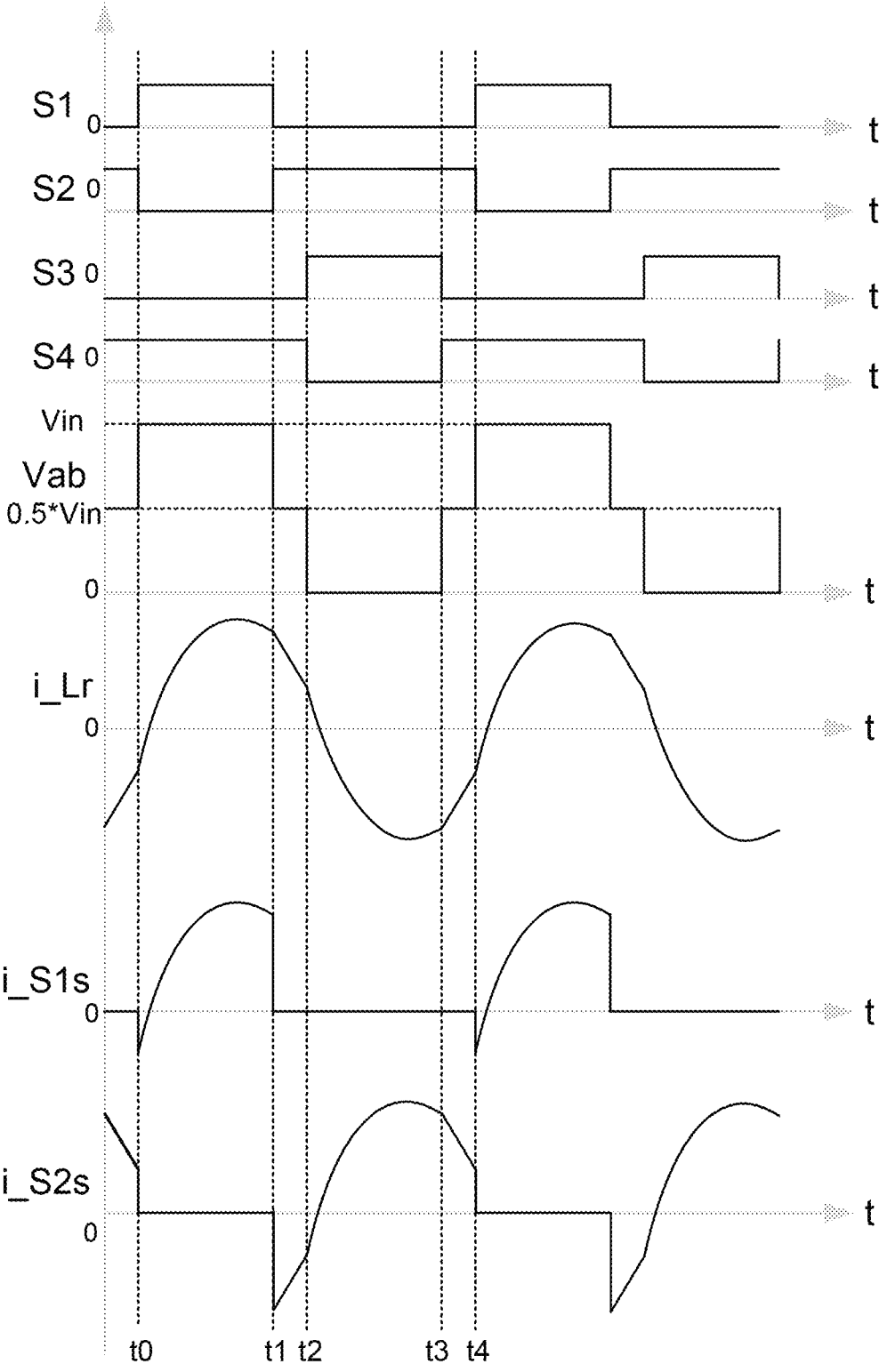
FIG. 3 is a diagram of a modulated pulse width modulation driving signal for the series half bridge resonant circuit.
Figure 4:
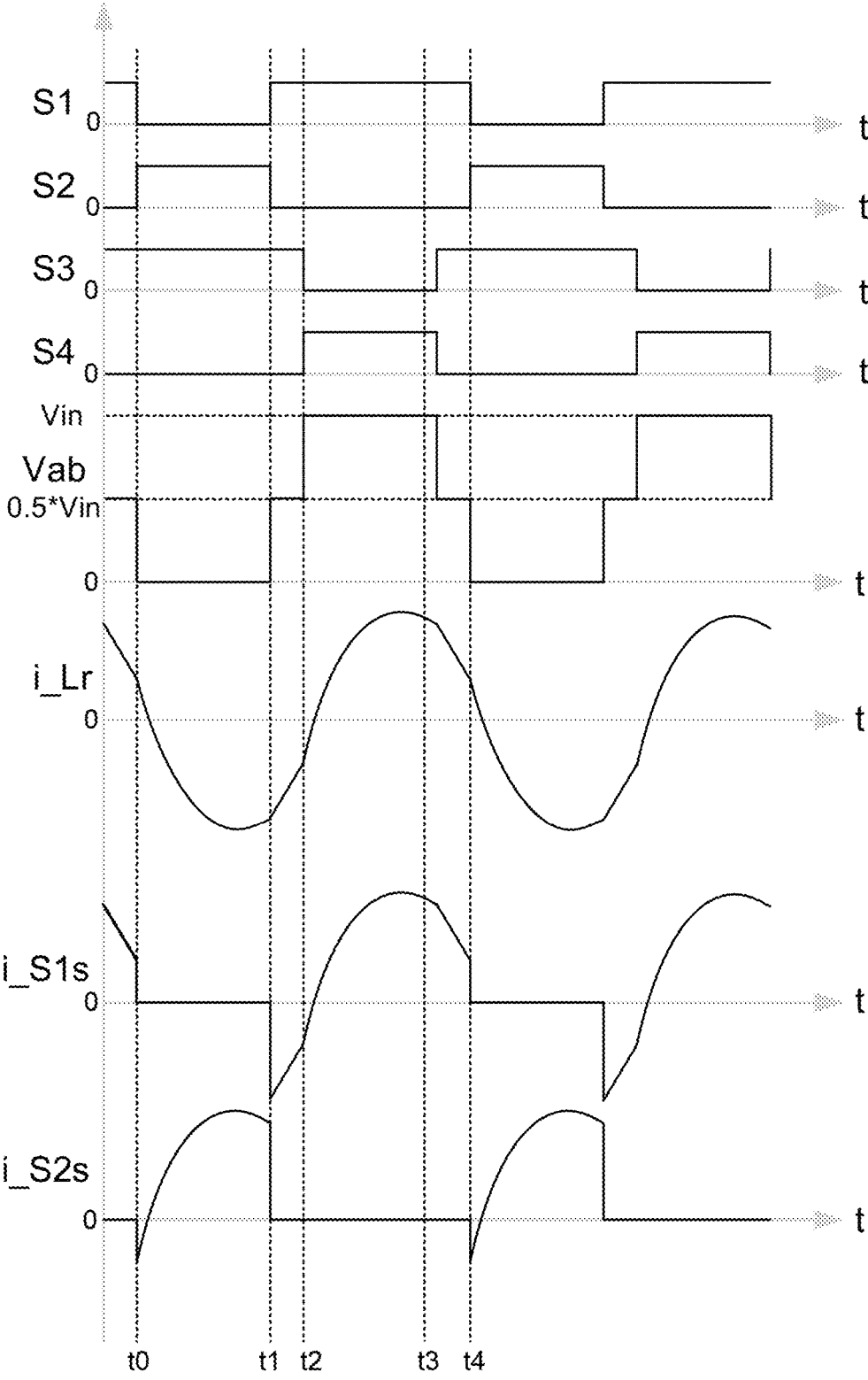
FIG. 4 is a diagram of another modulated pulse width modulation driving signal for the series half bridge resonant circuit.

The series half bridge resonant circuit can reduce gain by increasing a switching frequency, and the traditional frequency modulation control allows Vab to only represent two levels of Vin and 0V. At this time, a duty cycle of the switches S1 to S4 is about 50%, and losses are equal. However, as for usage scenario of high voltage input and low voltage output, sometimes, it is difficult to satisfy the requirement of low gain by purely increasing the switching frequency, so the switching frequency may be avoided to be too large by changing an effective value of the excitation source Vab, and it is a good choice to change the effective value of the excitation source Vab through three-level control. FIGS. 3 and 4 show three-level modulation ways of two series half bridge resonant topologies, respectively, where Vab represents three levels Vin, 0.5*Vin and 0V, and regardless of two levels or three levels, an average voltage of the resonant capacitor Cr both is 0.5*Vin.

FIG. 3 shows a modulation way of the series half bridge resonant circuit, such as, a first driving mode. In the modulation way, on the premise of ignoring influence of a dead zone, pulse width modulation driving signal for the first switch S1 and pulse width modulation driving signal for the second switch S2 are complementary to each other, pulse width modulation driving signal for the third switch S3 and pulse width modulation driving signal for the fourth switch S4 are complementary to each other, the first switch S1 and the third switch S3 have the same first duty cycle, with a difference of 180° between the phases of the first switch S1 and the third switch S3. As shown in the figure, the first duty cycle is less than 50%, since the pulse width modulation driving signal for the second switch S2 and pulse width modulation driving signal for the first switch S1 are complementary to each other, and the pulse width modulation driving signal for the fourth switch S4 and pulse width modulation driving signal for the third switch S3 are complementary to each other, the duty cycle of the second switch S2 is the same as that of the fourth switch S4, and based on signal complementary relations, the duty cycles of the second switch S2 and the fourth switch S4 are greater than 50%.

Taking one switching cycle for example, at t0 to t1, the first switch S1 and the fourth switch S4 are turned on, and the voltage source Vin delivers energy to the resonant tank and the output; at t1 to t2, the second switch S2 and the fourth switch S4 are turned on, a current of the resonant tank circulates through the second switch S2 and the fourth switch S4, and the capacitor C2 delivers energy to the resonant tank and the output; at t2 to t3, the second switch S2 and the third switch S3 are turned on, and the resonant tank delivers energy to the output; at t3 to t4, the second switch S2 and the fourth switch S4 are turned on, the current of the resonant tank circulates through the second switch S2 and the fourth switch S4, and the resonant tank supplies energy to the capacitor C2 and the output. Since the duty cycle of the first switch S1 and the third switch S3 in the driving mode is less than 50%, and the duty cycle of the second switch S2 and the fourth switch S4 in the driving mode is greater than 50%, the corresponding effective current of the second switch S2 and the fourth switch S4 also becomes greater, so losses of the second switch S2 and the fourth switch S4 are greater than losses of the first switch S1 and the third switch S3. The duty cycle of the switches S1 to S4 is computed by a loop, and determines a gain of the circuit.

FIG. 4 shows another modulation way of the series half bridge resonant circuit, such as, a second driving mode. In the modulation way, on the premise of ignoring influence of a dead zone, the difference from the modulation way of FIG. 3 is that the first switch S1 and the third switch S3 have the same second duty cycle, and the second duty cycle is greater than 50%. Therefore, at t1 to t2 and t3 to t4 of FIG. 4, circuit circulation occurs between the first switch S1 and the third switch S3, and an effective current of the first switch S1 is greater than that of the second switch S2. Similarly, an effective current of the third switch S3 is greater than that of the fourth switch S4, the loss of the first switch S1 is the same as the loss of the third switch S3, and the loss of the second switch S2 is the same as the loss of the fourth switch S4. However, the losses of the first switch S1 and the third switch S3 in the second driving mode are greater than losses of the second switch S2 and the fourth switch S4.

Figure 5:
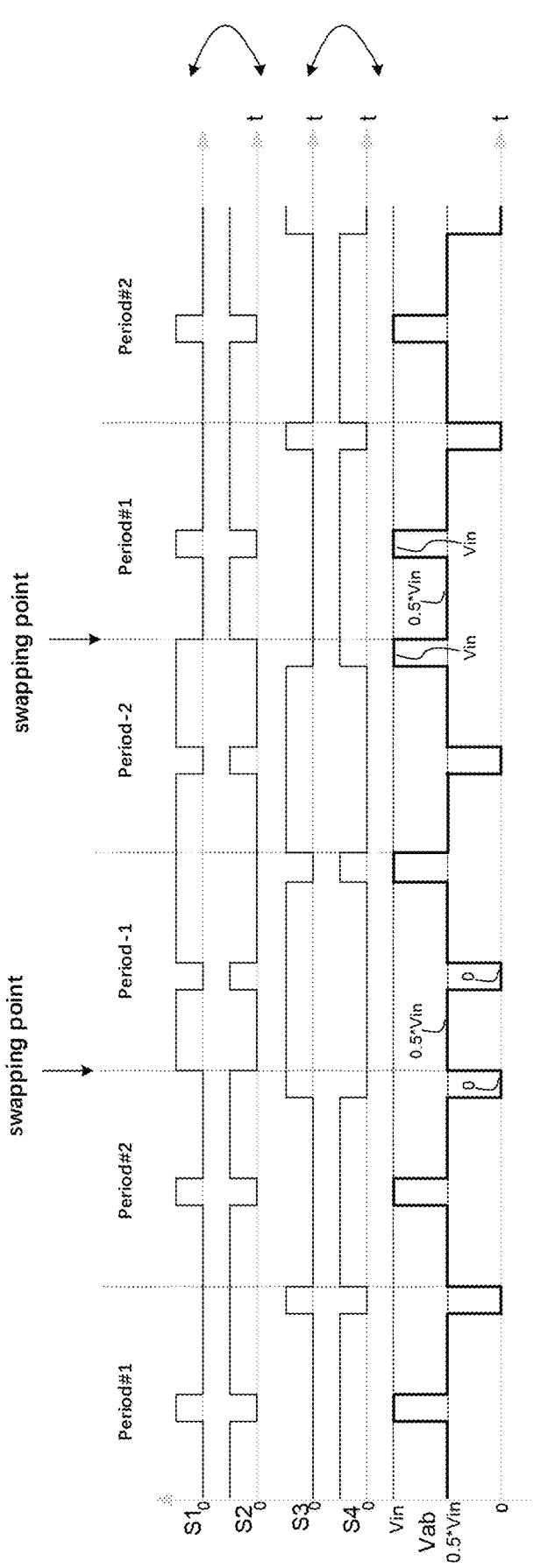
FIG. 5 is a signal waveform diagram of a first embodiment where the pulse width modulation method according to an embodiment of the present disclosure is applied to the series half bridge resonant circuit when driving modes are switched.

Combining with the two modulation ways of the series half bridge resonant circuit, in an alternative embodiment of the first example, the present disclosure provides a pulse width modulation method, comprising in a first time window, controlling the series half bridge resonant circuit to operate in the first driving mode, and in a second time window, controlling the series half bridge resonant circuit to operate in the second driving mode, and losses in different switches tend to balance using alternating switch of the first driving mode and the second driving mode corresponding to the first time window and the second time window, respectively. Specifically, in one embodiment of the first example, the first switch S1, the second switch S2, the third switch S3 and the fourth switch S4 of the series half bridge resonant circuit in the first driving mode and the second driving mode satisfy: pulse width modulation driving signal for the first switch S1 in the first driving mode is the same as pulse width modulation driving signal for the second switch S2 in the second driving mode, the pulse width modulation driving signal for the second switch S2 in the first driving mode is the same as the pulse width modulation driving signal for the first switch S1 in the second driving mode, a pulse width modulation driving signal for the third switch S3 in the first driving mode is the same as a pulse width modulation driving signal for the fourth switch S4 in the second driving mode, and the pulse width modulation driving signal for the fourth switch S4 in the first driving mode is the same as the pulse width modulation driving signal for the third switch S3 in the second driving mode. The pulse width modulation driving signals for the first switch S1, the second switch S2, the third switch S3 and the fourth switch S4 of the series half bridge resonant circuit in the first driving mode, for example, may be achieved by swapping with the driving signals of the first switch and the second switch in the second driving mode, and swapping with the driving signals of the third switch and the fourth switch in the second driving mode. Alternatively, the pulse width modulation driving signals for the first switch S1, the second switch S2, the third switch S3 and the fourth switch S4 of the series half bridge resonant circuit in the second driving mode, for example, may be achieved by swapping with the pulse width modulation driving signals for the first switch and the second switch in the first driving mode, and swapping with the pulse width modulation driving signals for the third switch and the fourth switch in the first driving mode. As shown in FIG. 5, it shows driving waveforms of the switches S1 to S4 and a voltage waveform Vab of the inverter bridge, where two switching cycles Period #1 and Period #2 are one first time window, and two switching cycles Period-1 and Period-2 are one second time window. The first time window shown by Period #1 and Period #2 uses a three-level driving way shown in FIG. 3, i.e., the first driving mode is the pulse width modulation way shown in FIG. 3. In the first driving mode, the first switch S1 and the third switch S3 have the same first duty cycle, which is less than 50%, and a duty cycle of the second switch S2 and the fourth switch S4 is greater than 50%, so losses of the first switch S1 and the third switch S3 are less than losses of the second switch S2 and the fourth switch S4. In the second time window shown by Period-1 and Period-2, for example, the pulse width modulation driving signals for the first switch S1 and the second switch S2 in the first driving mode are swapped, and the pulse width modulation driving signals for the third switch S3 and the fourth switch S4 in the first driving mode are swapped, so the pulse width modulation way of the bridge circuit uses a three-level driving way shown in FIG. 4, i.e., the second driving mode is the pulse width modulation way shown in FIG. 4. In the second driving mode, the first switch S1 and the third switch S3 have the same second duty cycle, which is greater than 50%, and a duty cycle of the second switch S2 and the fourth switch S4 is less than 50%, so losses in the first switch S1 and the third switch S3 are greater than losses in the second switch S2 and the fourth switch S4. At each time node connecting the first time window and the second time window shown in FIG. 5, for example, the pulse width modulation driving signals for the first switch S1 and the second switch S2 are swapped, the pulse width modulation driving signals for the third switch S3 and the fourth switch S4 are swapped, and the waveform Vab near the time node corresponding to mode swapping has the following features: when Period #2 is switched to Period-1, Vab represents a state of 0V→0.5*Vin→0V, when Period-2 is switched to Period #1, Vab represents a state of Vin→0.5*Vin→Vin.

Figure 6:
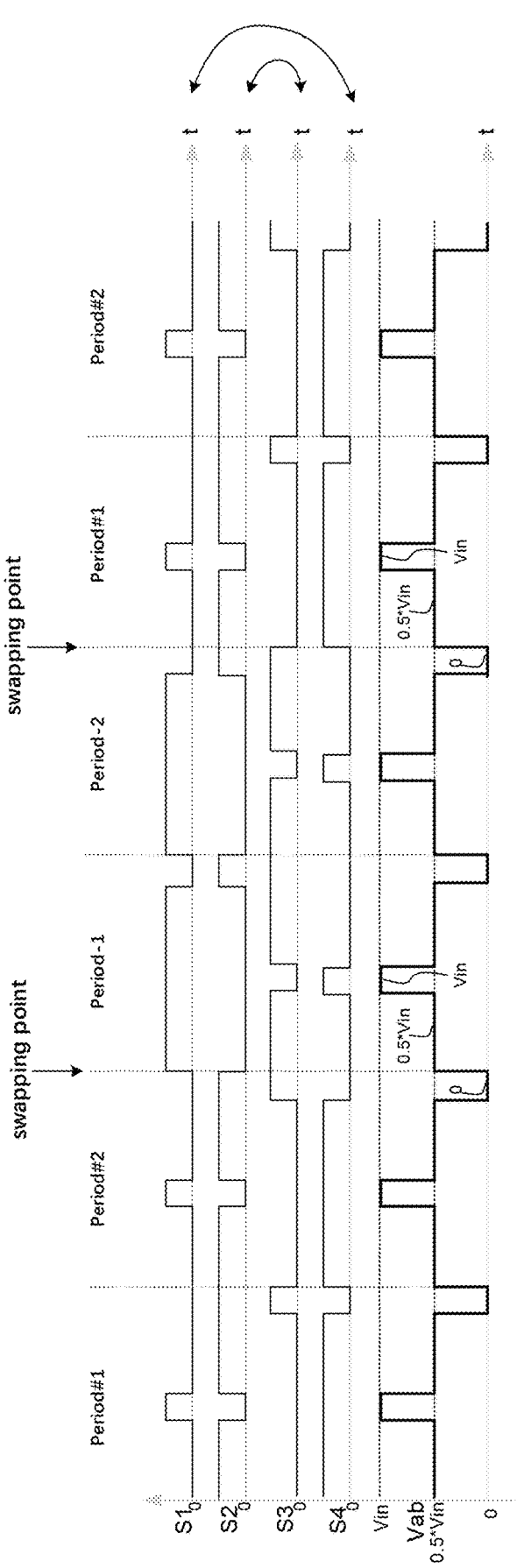
FIG. 6 is a signal waveform diagram of a second embodiment where the pulse width modulation method according to an embodiment of the present disclosure is applied to the series half bridge resonant circuit when driving modes are switched.

However, in another embodiment of the first example, the first switch S1, the second switch S2, the third switch S3 and the fourth switch S4 of the series half bridge resonant circuit in the first driving mode and the second driving mode satisfy: the pulse width modulation driving signal for the first switch in the first driving mode is the same as the driving signal of the fourth switch in the second driving mode, the pulse width modulation driving signal for the fourth switch in the first driving mode is the same as the pulse width modulation driving signal for the first switch in the second driving mode, the pulse width modulation driving signal for the second switch in the first driving mode is the same as the pulse width modulation driving signal for the third switch in the second driving mode, and the pulse width modulation driving signal for the third switch in the first driving mode is the same as the pulse width modulation driving signal for the fourth switch in the second driving mode. The pulse width modulation driving signals for the first switch S1, the second switch S2, the third switch S3 and the fourth switch S4 of the series half bridge resonant circuit in the first driving mode, for example, may be achieved by swapping with the pulse width modulation driving signals for the first switch and the fourth switch in the second driving mode, and swapping with the pulse width modulation driving signals for the second switch and the third switch in the second driving mode. Alternatively, the pulse width modulation driving signals for the first switch S1, the second switch S2, the third switch S3 and the fourth switch S4 of the series half bridge resonant circuit in the second driving mode, for example, may be achieved by swapping with the pulse width modulation driving signals for the first switch and the fourth switch in the first driving mode, and swapping with the pulse width modulation driving signals for the second switch and the third switch in the first driving mode. As shown in FIG. 6, it also shows driving waveforms of the switches S1 to S4 and a voltage waveform Vab of the inverter bridge, where the two switching cycles Period #1 and Period #2 are one first time window, and the two switching cycles Period-1 and Period-2 are one second time window. In this embodiment, when the bridge circuit is switched between the first driving mode and the second driving mode, for example, the pulse width modulation driving signals for the first switch S1 and the fourth switch S4 may be swapped, and the pulse width modulation driving signals for the second switch S2 and the third switch S3 may be swapped. As can be known from the figure, in the first time window, a duty cycle of the first switch S1 and the third switch S3 is less than 50%, and a duty cycle of the second switch S2 and the fourth switch S4 is greater than 50%; in the second time window, the duty cycle of the first switch S1 and the third switch S3 is greater than 50%, and the duty cycle of the second switch S2 and the fourth switch S4 is less than 50%, so in the first time window, losses produced in the first switch S1 and the third switch S3 are less than that of the second switch S2 and the fourth switch S4, and in the second time window, losses produced in the first switch S1 and the third switch S3 are greater than that of the second switch S2 and the fourth switch S4. That is, at each time node connecting the first time window and the second time window shown in FIG. 6, for example, the pulse width modulation driving signals for the first switch S1 and the fourth switch S4 may be swapped, the driving ways of the second switch S2 and the third switch S3 may be swapped, and the waveform Vab near the time node corresponding to mode swapping has the following features: when Period #2 is switched to Period-1, Vab represents a state of 0V→0.5*Vin→Vin, and when Period-2 is switched to Period #1, Vab represents a state of 0→0.5*Vin→Vin. As time goes on, losses of the switches tend to be the same, such that all switches of the bridge circuit finally achieve thermal balance.

Figure 7:
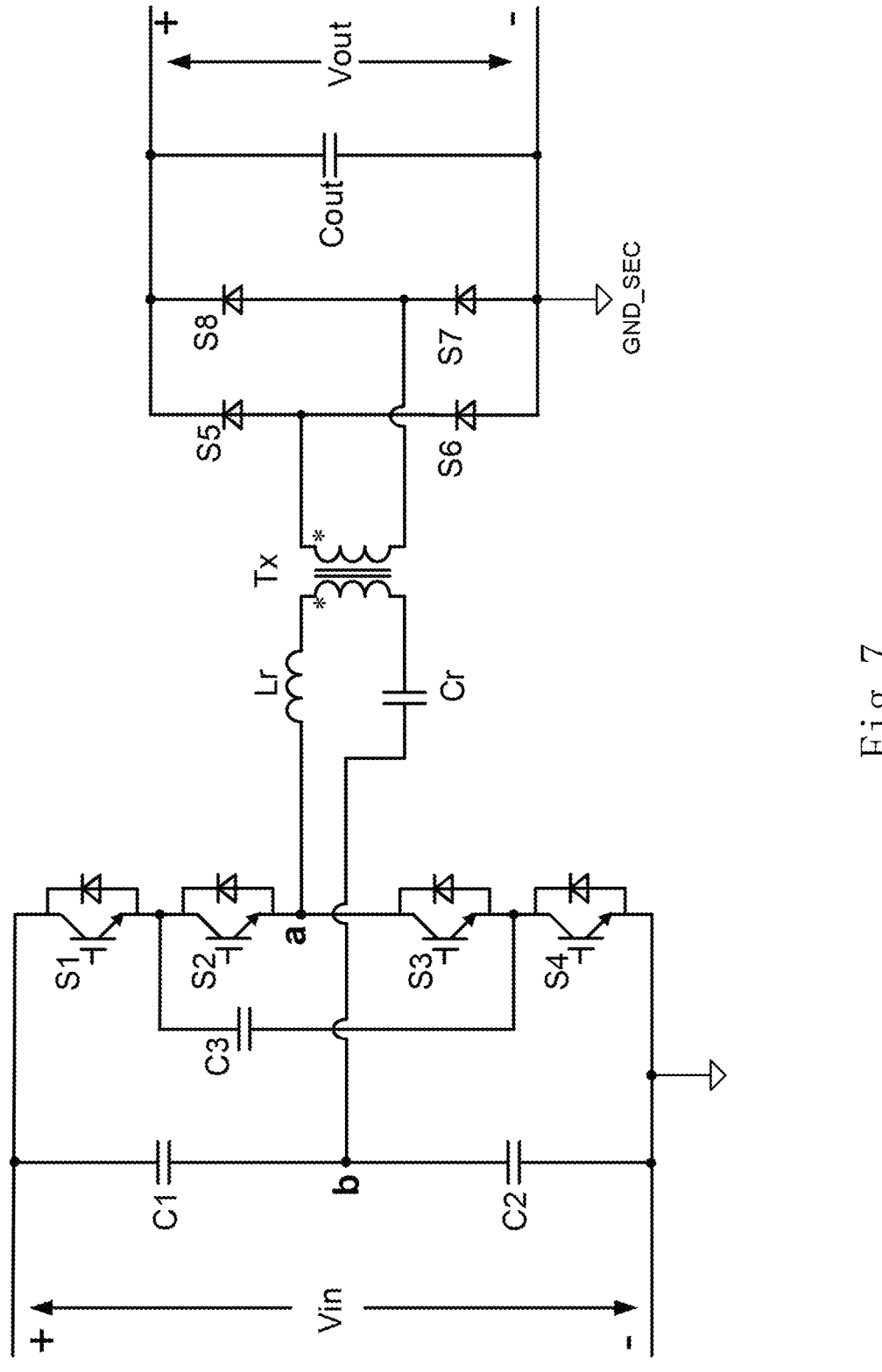
FIG. 7 is a topological diagram of a flying capacitor half bridge resonant circuit.

Referring to FIG. 7, in the second example, the bridge circuit, for example, is a flying capacitor half bridge resonant circuit comprising an inverter bridge, a flying capacitor C3 and a resonant tank, the inverter bridge comprising an upper half bridge and a lower half bridge that are connected in series, the upper half bridge comprising a first bridge arm comprising a first switch S1 and a second switch S2 that are sequentially connected in series, and a first capacitor C1 connected in parallel to the first bridge arm, and the lower half bridge comprising a second bridge arm comprising a third switch S3 and a fourth switch S4 that are sequentially connected in series, and a second capacitor C2 connected in parallel to the second bridge arm; the flying capacitor C3 has one end connected to a connection point of the first switch S1 and the second switch S2, and the other end connected to a connection point of the third switch S3 and the fourth switch S4; in the first driving mode and the second driving mode, pulse width modulation driving signal for the first switch S1 and pulse width modulation driving signal for the fourth switch S4 are complementary to each other, pulse width modulation driving signal for the second switch S2 and pulse width modulation driving signal for the third switch S3 are complementary to each other, with a difference of 180° between the phases of the pulse width modulation driving signals for the first switch S1 and the third switch S3. The resonant tank in the figure comprises a resonant inductor Lr and a resonant capacitor Cr, the resonant tank has one end connected to a point a between the second switch S2 and the third switch S3, and the other end connected to a point b between the first capacitor C1 and the second capacitor C2, a voltage source of the inverter bridge is Vin, and an output is an excitation source Vab. A primary side circuit of the bridge circuit comprises the resonant tank and the inverter bridge, the bridge circuit of the embodiment is a DC/DC conversion circuit, and further comprises a transformer Tx, a rectifier circuit and an output capacitor, the resonant tank is electrically connected between the inverter bridge and a primary winding of the transformer, the rectifier circuit is electrically connected between a secondary winding of the transformer Tx and the output capacitor Cout, and the rectifier circuit, for example, is consisting of diodes S5 to S8. As for the excitation source Vab, gains may be changed using the traditional two-level frequency modulation way, such that the duty cycles of the switches S1 to S4 are 50%, and losses are equal, the switching frequency also can be avoided to be too large by changing an effective value of the excitation source Vab, and it is preferable to use the way of three-level control.

Figure 8:
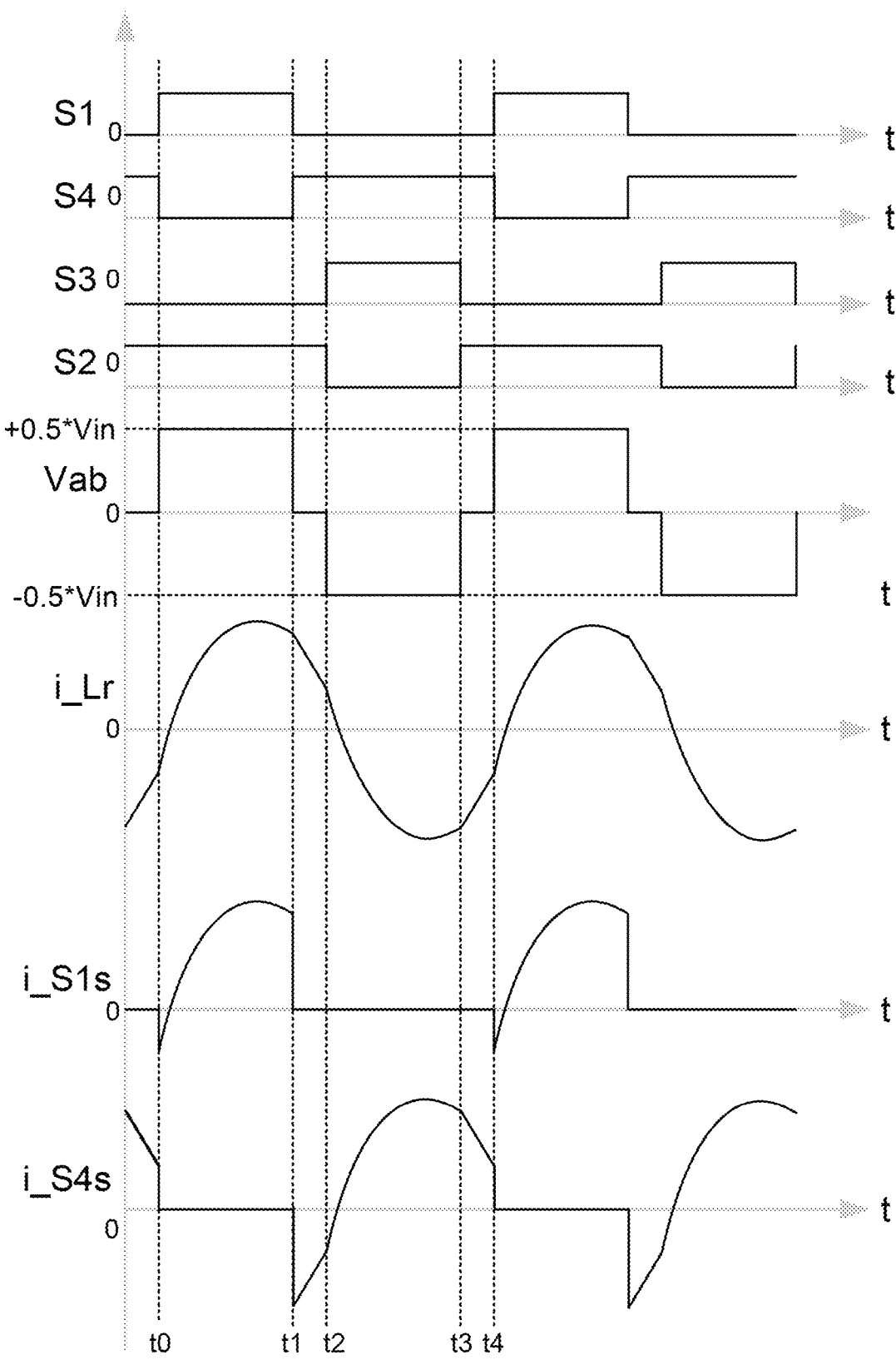
FIG. 8 is a diagram of a modulated pulse width modulation driving signal for the flying capacitor half bridge resonant circuit.

FIG. 8 shows a three-level modulation way of the flying capacitor half bridge resonant circuit, such as, a first driving mode. In the modulation method, on the premise of ignoring influence of a dead zone, pulse width modulation driving signal for the first switch S1 and pulse width modulation driving signal for the fourth switch S4 are complementary to each other, pulse width modulation driving signal for the second switch S2 and pulse width modulation driving signal for the third switch S3 are complementary to each other, and the pulse width modulation driving signals for the first switch S1 and the third switch S3 have the same waveform, and phases that differ by 180°. Under the modulation way, the excitation source Vab has three levels, which are +0.5*Vin, 0V and −0.5*Vin, respectively, an average voltage of the flying capacitor C3 is 0.5*Vin, and an average voltage of the resonant capacitor Cr is 0V. The loss of the first switch S1 is the same as the loss of the third switch S3, and the loss of the second switch S2 is the same as the loss of the fourth switch S4. However, since the duty cycle of the second switch S2 and the fourth switch S4 is greater than 50%, losses of the first switch S1 and the third switch S3 are less than losses of the second switch S2 and the fourth switch S4.

Figure 9:
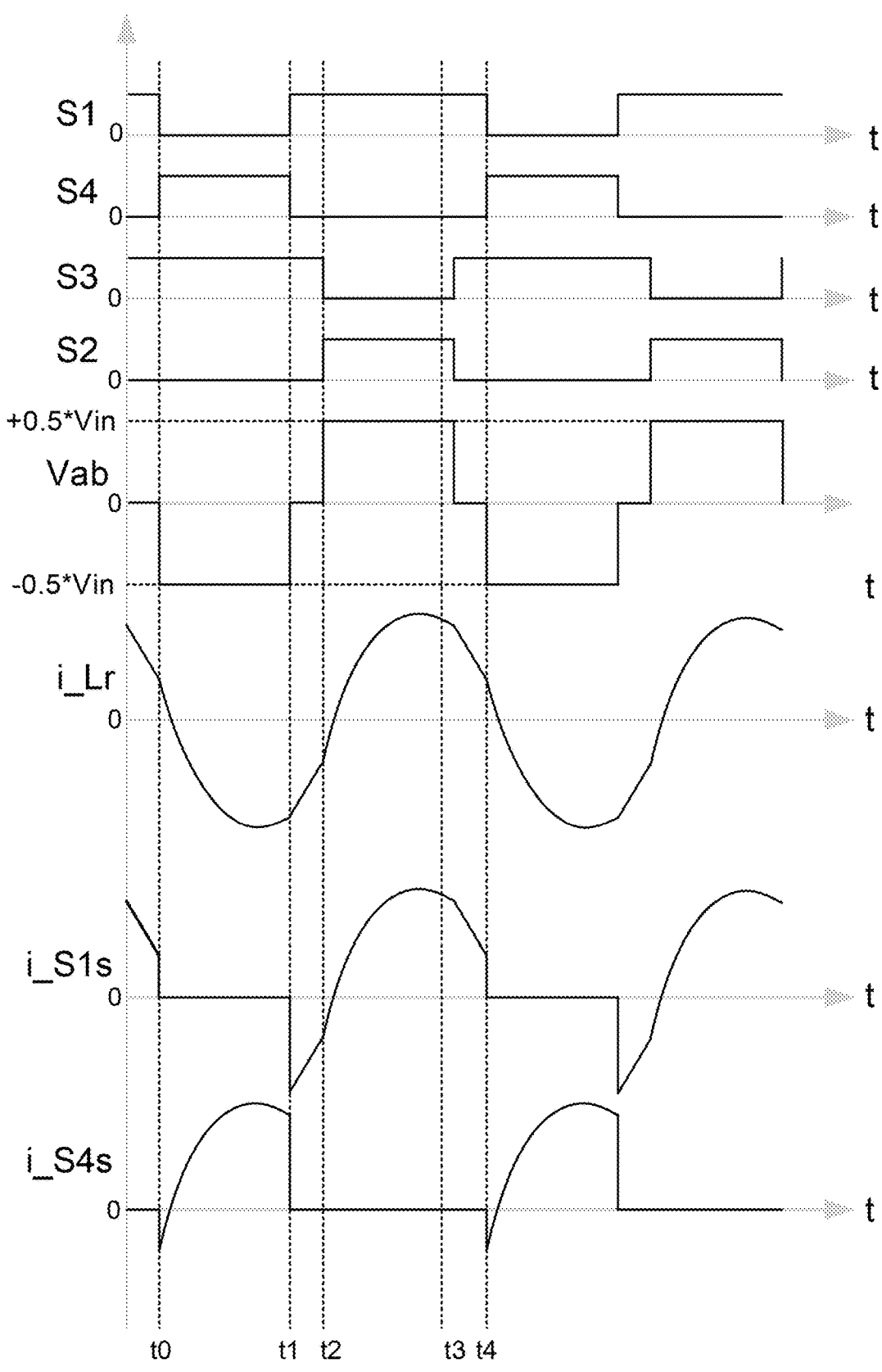
FIG. 9 is a diagram of another modulated pulse width modulation driving signal for the flying capacitor half bridge resonant circuit.

FIG. 9 shows another three-level modulation way of the flying capacitor half bridge resonant circuit, such as, a second driving mode. In the modulation way, on the premise of ignoring influence of a dead zone, pulse width modulation driving signal for the first switch S1 and pulse width modulation driving signal for the fourth switch S4 are complementary to each other, pulse width modulation driving signal for the second switch S2 and pulse width modulation driving signal for the third switch S3 are complementary to each other, and the pulse width modulation driving signals for the first switch S1 and the third switch S3 have the same waveform, and phases that differ by 180°. Under the modulation way, the excitation source Vab has three levels, which are +0.5*Vin, 0V and −0.5*Vin, respectively, an average voltage of the flying capacitor C3 is 0.5*Vin, and an average voltage of the resonant capacitor Cr is 0V. The difference from the above modulation way is that the duty cycle of the first switch S1 and the third switch S3 is greater than 50%, and the duty cycle of the second switch S2 and the fourth switch S4 is less than 50%, so losses of the first switch S1 and the third switch S3 are greater than losses of the second switch S2 and the fourth switch S4.

Figure 10:
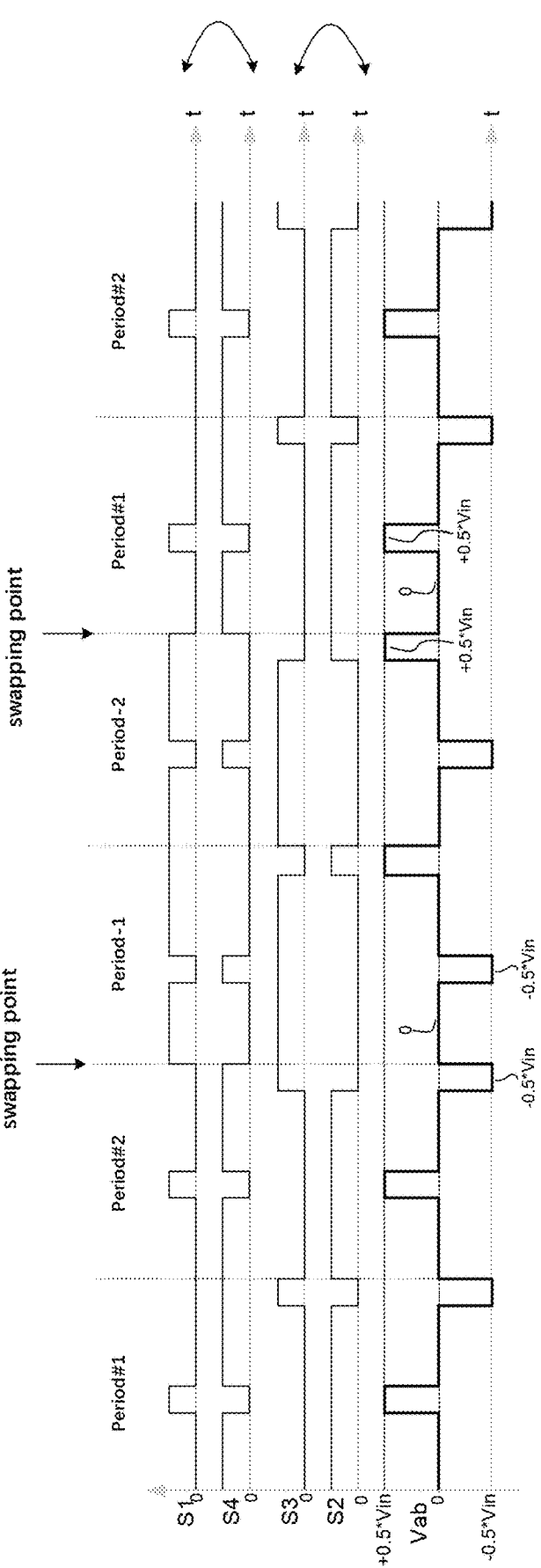
FIG. 10 is a signal waveform diagram of a first embodiment where the pulse width modulation method according to an embodiment of the present disclosure is applied to the flying capacitor half bridge resonant circuit when driving modes are switched.

Combining with the two modulation ways of the flying capacitor half bridge resonant circuit, in an alternative embodiment of the second example, the present disclosure provides a pulse width modulation method, comprising in a first time window, controlling the flying capacitor half bridge resonant circuit to operate in the first driving mode, and in a second time window, controlling the flying capacitor half bridge resonant circuit to operate in the second driving mode, and losses in different switches tend to balance using alternating switch of the first driving mode and the second driving mode corresponding to the first time window and the second time window respectively. Specifically, in an alternative embodiment of the second example, the first switch S1, the second switch S2, the third switch S3 and the fourth switch S4 of the flying capacitor half bridge resonant circuit in the first driving mode and the second driving mode satisfy: the pulse width modulation driving signal for the first switch S1 in the first driving mode is the same as the pulse width modulation driving signal for the fourth switch S4 in the second driving mode, the pulse width modulation driving signal for the fourth switch S4 in the first driving mode is the same as the pulse width modulation driving signal for the first switch S1 in the second driving mode, the pulse width modulation driving signal for the third switch S3 in the first driving mode is the same as the pulse width modulation driving signal for the second switch S2 in the second driving mode, and the pulse width modulation driving signal for the second switch S2 in the first driving mode is the same as the pulse width modulation driving signal for the third switch S3 in the second driving mode. The pulse width modulation driving signals for the first switch S1, the second switch S2, the third switch S3 and the fourth switch S4 of the flying capacitor half bridge resonant circuit in the first driving mode, for example, may be achieved by swapping with the pulse width modulation driving signals for the first switch S1 and the fourth switch S4 in the second driving mode, and swapping with the pulse width modulation driving signals for the second switch S2 and the third switch S3 in the second driving mode. Alternatively, the pulse width modulation driving signals for the first switch S1, the second switch S2, the third switch S3 and the fourth switch S4 of the flying capacitor half bridge resonant circuit in the second driving mode, for example, may be achieved by swapping with the pulse width modulation driving signals for the first switch S1 and the fourth switch S4 in the first driving mode, and swapping with the pulse width modulation driving signals for the second switch S2 and the third switch S3 in the first driving mode. As shown in FIG. 10, it shows driving waveforms of the switches S1 to S4 and a voltage waveform Vab of the inverter bridge, where the two switching cycles Period #1 and Period #2 are one first time window, and the two switching cycles Period-1 and Period-2 are one second time window. The first time window shown by Period #1 and Period #2 uses a three-level driving way shown in FIG. 8, i.e., the first driving mode is the pulse width modulation way shown in FIG. 8. In the first driving mode, the first switch S1 and the third switch S3 have the same first duty cycle, which is less than 50%, and since the pulse width modulation driving signal for the first switch S1 and the pulse width modulation driving signal for the fourth switch S4 are complementary to each other, and the pulse width modulation driving signal for the third switch S3 and the pulse width modulation driving signal for the second switch S2 are complementary to each other, the duty cycle of the second switch S2 and the fourth switch S4 is greater than 50%, so losses of the first switch S1 and the third switch S3 are less than losses of the second switch S2 and the fourth switch S4. In the second time window shown by Period-1 and Period-2, for example, the pulse width modulation driving signals for the first switch S1 and the fourth switch S4 in the first driving mode are swapped, and the pulse width modulation driving signals for the second switch S2 and the third switch S3 in the first driving mode are swapped, so the pulse width modulation way of the bridge circuit used in the second time window is a three-level driving way shown in FIG. 9, i.e., the second driving mode is the pulse width modulation way shown in FIG. 9. In the second driving mode, the first switch S1 and the third switch S3 have the same second duty cycle, which is greater than 50%, and since the pulse width modulation driving signal for the first switch S1 and the pulse width modulation driving signal for the fourth switch S4 are complementary to each other, and the pulse width modulation driving signal for the third switch S3 and the pulse width modulation driving signal for the second switch S2 are complementary to each other, the duty cycle of the second switch S2 and the fourth switch S4 is less than 50%, so losses of the first switch S1 and the third switch S3 are greater than losses in the second switch S2 and the fourth switch S4. At each time node connecting the first time window and the second time window shown in FIG. 10, for example, the pulse width modulation driving signals for the first switch S1 and the fourth switch S4 are swapped, the pulse width modulation driving signals for the second switch S2 and the third switch S3 are swapped, and the waveform Vab near the time node corresponding to mode swapping has the following features: when Period #2 is switched to Period-1, Vab represents a state of $-0.5*Vin \rightarrow 0V \rightarrow -0.5*Vin$, and when Period-2 is switched to Period #1, Vab represents a state of $+0.5*Vin \rightarrow 0V \rightarrow +0.5*Vin$.

Figure 11:
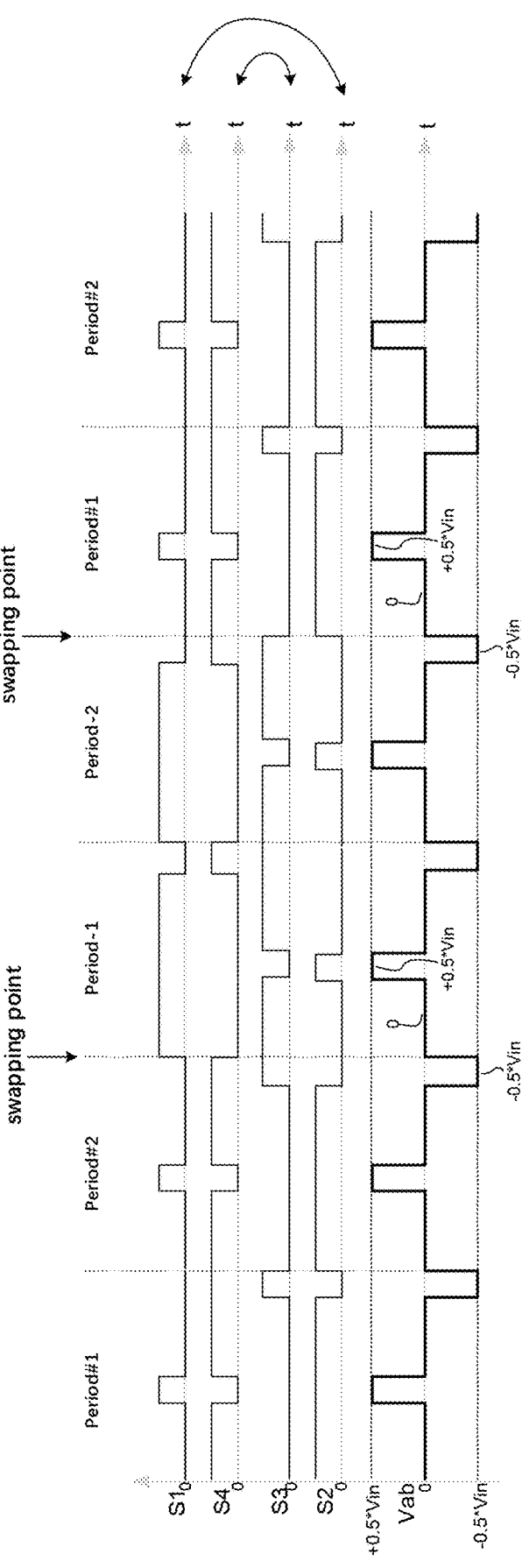
FIG. 11 is a signal waveform diagram of a second embodiment where the pulse width modulation method according to an embodiment of the present disclosure is applied to the flying capacitor half bridge resonant circuit when driving modes are switched.

However, in another embodiment of the second example, the first switch S1, the second switch S2, the third switch S3 and the fourth switch S4 of the flying capacitor half bridge resonant circuit in the first driving mode and the second driving mode satisfy: the pulse width modulation driving signal for the first switch S1 in the first driving mode is the same as the pulse width modulation driving signal for the second switch S2 in the second driving mode, the pulse width modulation driving signal for the second switch S2 in the first driving mode is the same as the pulse width modulation driving signal for the first switch S1 in the second driving mode, the pulse width modulation driving signal for the fourth switch S4 in the first driving mode is the same as the pulse width modulation driving signal for the third switch S3 in the second driving mode, and the pulse width modulation driving signal for the third switch S3 in the first driving mode is the same as the pulse width modulation driving signal for the fourth switch S4 in the second driving mode. The pulse width modulation driving signals for the first switch S1, the second switch S2, the third switch S3 and the fourth switch S4 of the flying capacitor half bridge resonant circuit in the first driving mode, for example, may be achieved by swapping with the pulse width modulation driving signals for the first switch S1 and the second switch S2 in the second driving mode, and swapping with the pulse width modulation driving signals for the third switch S3 and the fourth switch S4 in the second driving mode. Alternatively, the pulse width modulation driving signals for the first switch S1, the second switch S2, the third switch S3 and the fourth switch S4 of the flying capacitor half bridge resonant circuit in the second driving mode, for example, may be achieved by swapping with the pulse width modulation driving signals for the first switch S1 and the second switch S2 in the first driving mode, and swapping with the pulse width modulation driving signals for the third switch S3 and the fourth switch S4 in the first driving mode. As shown in FIG. 11, it also shows driving waveforms of the switches S1 to S4 and a voltage waveform Vab of the inverter bridge, where the two switching cycles Period #1 and Period #2 are one first time window, and the two switching cycles Period-1 and Period-2 are one second time window. In this embodiment, when the bridge circuit is switched between the first driving mode and the second driving mode, for example, the pulse width modulation driving signals for the first switch S1 and the second switch S2 are swapped, and the pulse width modulation driving signals for the second switch S3 and the fourth switch S4 are swapped. A duty cycle of the first switch S1 and the third switch S3 in the first time window is less than 50%, while a duty cycle in the second time window is greater than 50%, and a duty cycle of the second switch S2 and the fourth switch S4 in the first time window is greater than 50%, while a duty cycle in the second time window is less than 50%, so losses produced in the first switch S1 and the third switch S3 in the first time window are less than that of the second switch S2 and the fourth switch S4, and losses produced in the first switch S1 and the third switch S3 in the second time window are greater than that of the second switch S2 and the fourth switch S4. That is, at each time node connecting the first time window and the second time window in the figure, for example, the pulse width modulation driving signals for the first switch S1 and the second switch S2 are swapped, the driving ways of the third switch S3 and the fourth switch S4 are swapped, and the waveform Vab near the time node corresponding to mode swapping has the following features: when Period #2 is switched to Period-1, Vab represents a state of $-0.5*Vin \to 0V \to +0.5*Vin$, when Period-2 is switched to Period #1, Vab represents a state of $-0.5*Vin \to 0V \to +0.5*Vin$. As time goes on, losses of the switches tend to be the same, such that all switches of the bridge circuit finally achieve thermal balance.

Figure 12:
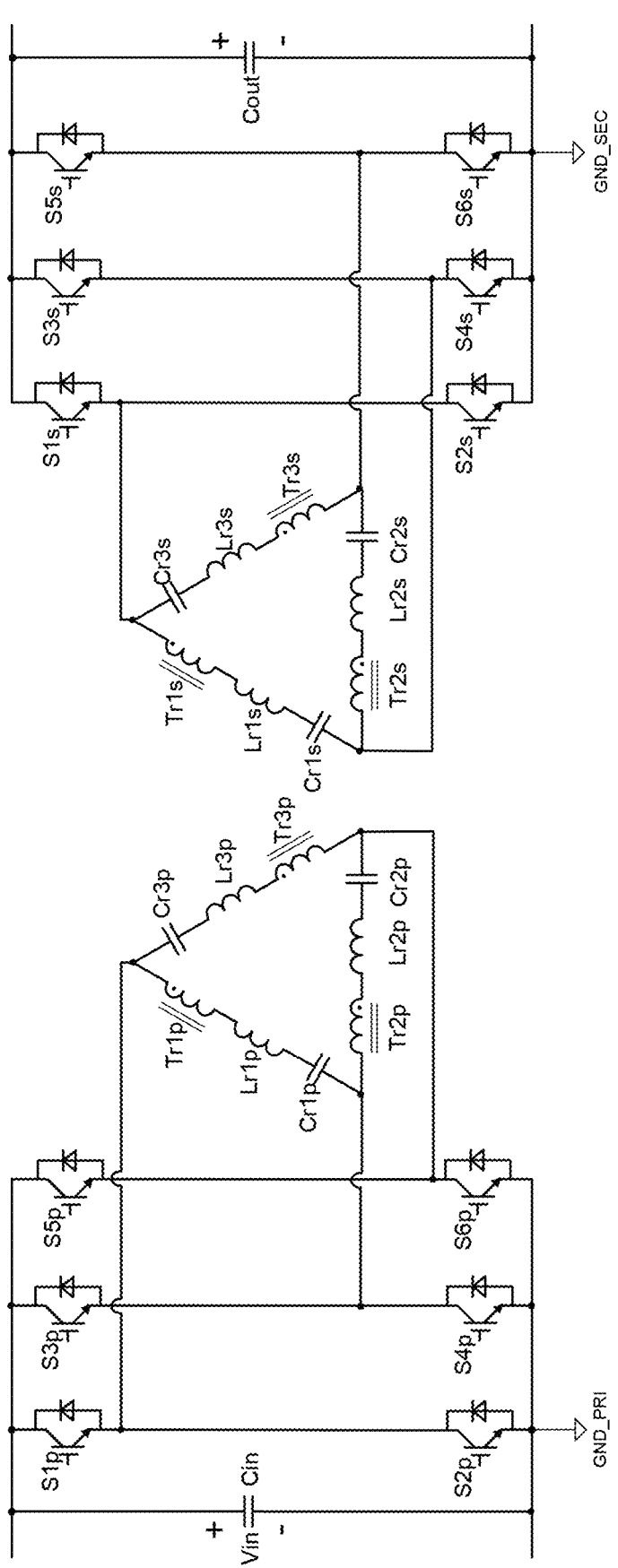
FIG. 12 is a topological diagram of a three-phase CLLC circuit with bidirectional power transmission.

Referring to FIG. 12, in the third example, the bridge circuit, for example, is a three-phase CLLC with bidirectional power transmission, and comprises a three-phase inverter bridge comprising a first bridge arm, a second bridge arm and a third bridge arm connected in parallel, wherein the first bridge arm comprises a first primary switch S1$p$ and a second primary switch S2$p$ that are sequentially connected in series, the second bridge arm comprises a third primary switch S3$p$ and a fourth primary switch S4$p$ that are sequentially connected in series, and the third bridge arm comprises a fifth primary switch S5$p$ and a sixth primary switch S6$p$ that are sequentially connected in series, a three-phase resonant network comprising a three-phase transformer and three groups resonant tanks corresponding to three groups of primary and secondary sides respectively (Lr1$p$,Cr1$p$,Lr1$s$,Cr1$s$; Lr2$p$,Cr2$p$,Lr2$s$,Cr2$s$; Lr3$p$,Cr3$p$, Lr3$s$,Cr3$s$), and a three-phase rectifier bridge comprising a fourth bridge arm, a fifth bridge arm and a sixth bridge arm that are connected in parallel, wherein the fourth bridge arm comprises a first secondary switch S1$s$ and a second secondary switch S2$s$ that are sequentially connected in series, the fifth bridge arm comprises a third secondary switch S3$s$ and a fourth secondary switch S4$s$ that are sequentially connected in series, and the sixth bridge arm comprises a fifth secondary switch S5$s$ and a sixth secondary switch S6$s$ that are sequentially connected in series, in the first driving mode and the second driving mode, pulse width modulation driving signal for the first primary switch S1$p$ and pulse width modulation driving signal for the second primary switch S2$p$ are complementary to each other, pulse width modulation driving signal for the third primary switch S3$p$ and pulse width modulation driving signal for the fourth primary switch S4$p$ are complementary to each other, and pulse width modulation driving signal for the fifth primary switch S5$p$ and pulse width modulation driving signal for the sixth primary switch S6$p$ are complementary to each other, a duty cycle of the primary switches in the three-phase inverter bridge is 50%, the phases of the pulse width modulation driving signals for the first primary switch S1$p$, the third primary switch S3$p$ and the fifth primary switch S5$p$ sequentially differ by 120 degrees, the phases of the pulse width modulation driving signals for the first secondary switch S1$s$, the third secondary switch S3$s$ and the fifth secondary switch S5$s$ sequentially differ by 120 degrees, and the phases of the pulse width modulation driving signals for the second secondary switch S2$s$, the fourth secondary switch S4$s$ and the sixth secondary switch S6$s$ sequentially differ by 120 degrees.

The three-phase transformer comprises a first group of transformers Tr1, a second group of transformers Tr2 and a third group of transformers Tr3 that are connected in series, the first group of transformers Tr1 comprises a first primary winding Tr1$p$ and a first secondary winding Tr1$s$, the second group of transformers Tr2 comprises a second primary winding Tr2$p$ and a second secondary winding Tr2$s$, and the third group of transformers Tr3 comprises a third primary winding Tr3$p$ and a third secondary winding Tr3$s$. Cr1$p$ and Lr1$p$ form the first resonant tank on a primary side (i.e., the first primary resonant tank) and is connected to the first primary winding Tr1$p$ of the three-phase transformer, Cr1$s$ and Lr1$s$ form the first resonant tank on a secondary side (i.e., the first secondary resonant tank) and is connected to the first secondary winding Tr1$s$ of the three-phase transformer, Cr2$p$ and Lr2$p$ form the second resonant tank on the primary side (i.e., the second primary resonant tank) and is connected to the second primary winding Tr2$p$ of the three-phase transformer, Cr2$s$ and Lr2$s$ form the second resonant tank on the secondary side (i.e., the second secondary resonant tank) and is connected to the second secondary winding Tr2$s$ of the three-phase transformer, Cr3$p$ and Lr3$p$ form the third resonant tank on the primary side (i.e., the third primary resonant tank) and is connected to the third primary winding Tr3$p$ of the three-phase transformer, Cr3$s$ and Lr3$s$ form the third resonant tank on the secondary side (i.e., the third secondary resonant tank) and is connected to the third secondary winding Tr3$s$ of the three-phase transformer, Cin is an input capacitor, and Cout is an output capacitor.

Figure 13:
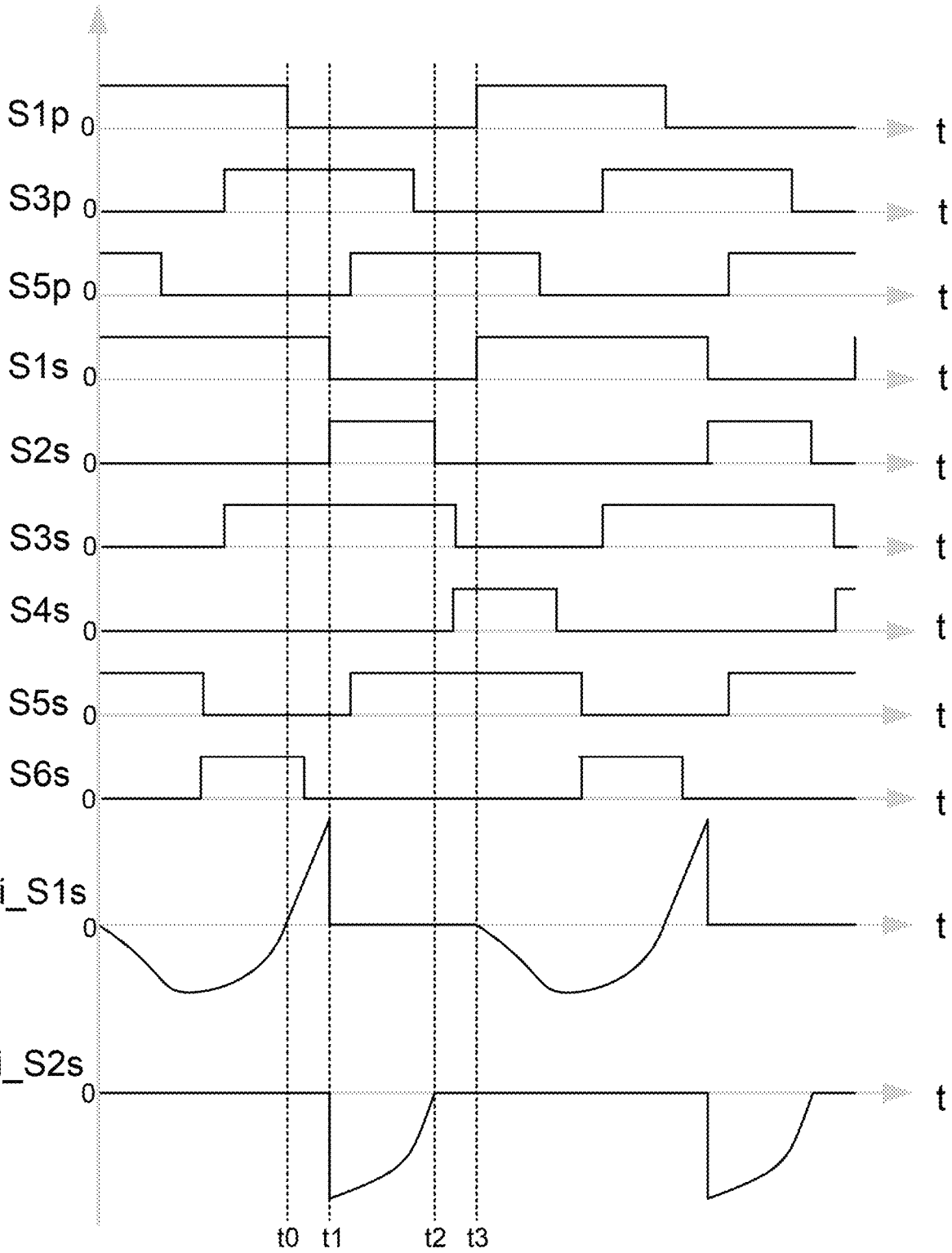
FIG. 13 is a diagram of a modulated pulse width modulation driving signal for the three-phase CLLC circuit with bidirectional power transmission.

FIG. 13 shows a first modulation way of the three-phase CLLC circuit with bidirectional power transmission, such as, a first driving mode. In the modulation way, under influence of ignoring a dead zone, duty cycles of the first primary switch S1$p$, the third primary switch S3$p$ and the fifth primary switch S5$p$ are 50%, and phases of pulse width modulation driving signals for the first primary switch S1$p$, the third primary switch S3$p$ and the fifth primary switch S5$p$ sequentially differ by 120 degrees. Moreover, although not shown in the figure, the pulse width modulation driving signal for the second primary switch S2$p$ and the pulse width modulation driving signal for the first primary switch S1$p$ are complementary to each other, the pulse width modulation driving signals for the fourth primary switch S4$p$ and the third primary switch S3$p$ are complementary to each other, and the pulse width modulation driving signals for the sixth primary switch S6$p$ and the fifth primary switch S5$p$ are complementary to each other. In the first driving mode of this example, a rising edge of the pulse width modulation driving signal for the first secondary switch S1$s$ is the same as a rising edge of the pulse width modulation driving signal for the first primary switch S1$p$, and a falling edge of the pulse width modulation driving signal for the first secondary switch S1*s* corresponds to a rising edge of the pulse width modulation driving signal for the second secondary switch S2*s*, a duty cycle of the first secondary switch S1*s* is greater than 50%, and a duty cycle of the second secondary switch S2*s* is less than 50%. A rising edge of the pulse width modulation driving signal for the third secondary switch S3*s* is the same as a rising edge of the pulse width modulation driving signal for the third primary switch S3*p*, and a falling edge of the pulse width modulation driving signal for the third secondary switch S3*s* corresponds to a rising edge of the pulse width modulation driving signal for the fourth secondary switch S4*s*. A duty cycle of the third secondary switch S3*s* is greater than 50%, and a duty cycle of the fourth secondary switch S4*s* is less than 50%. A rising edge of the pulse width modulation driving signal for the fifth secondary switch S5*s* is the same as a rising edge of the pulse width modulation driving signal for the fifth primary switch S5*p*, and a falling edge of the pulse width modulation driving signal for the fifth secondary switch S5*s* corresponds to a rising edge of the pulse width modulation driving signal for the sixth secondary switch S6*s*. A duty cycle of the fifth secondary switch S5*s* is greater than 50%, and a duty cycle of the sixth secondary switch S6*s* is less than 50%. That is, the first driving mode of this example uses the modulation way shown in FIG. 13. Therefore, at t0 to t1, benefiting from delay in the falling edge of the first secondary switch S1*s* as compared to a falling edge of the first primary switch S1*p*, a current flowing the first secondary switch S1*s* rapidly rises after passing zero. At a time t1, the first secondary switch S1*s* is hard turned off. Subsequently, a current flows a body diode of the second secondary switch S2*s*, and meanwhile, the pulse width modulation driving signal for the second secondary switch S2*s* has a high level. At a time t2, the current of the second secondary switch S2*s* is decreased to 0 A, and in order to avoid energy from flowing backward from an output end, the pulse width modulation driving signal for the second secondary switch S2*s* shall be changed to a low level. During t2 to t3, the currents of the first secondary switch S1*s* and the second secondary switch S2*s* are both 0V. In such modulation way, losses of the first secondary switch S1*s*, the third secondary switch S3*s* and the fifth secondary switch S5*s* are the same, and losses of the second secondary switch S2*s*, the fourth secondary switch S4*s* and the sixth secondary switch S6*s* are the same, but since the duty cycle of the first secondary switch S1*s*, the third secondary switch S3*s* and the fifth secondary switch S5*s* is greater than 50%, an effective current flowing these switches is greater than an effective current flowing the second secondary switch S2*s*, the fourth secondary switch S4*s* and the sixth secondary switch S6*s*. Moreover, the first secondary switch S1*s*, the third secondary switch S3*s* and the fifth secondary switch S5*s* also have turn-off losses, while the second secondary switch S2*s*, the fourth secondary switch S4*s* and the sixth secondary switch S6*s* do not have turn-off losses, so a total loss of the first secondary switch S1*s*, the third secondary switch S3*s* and the fifth secondary switch S5*s* is greater than a total loss of the second secondary switch S2*s*, the fourth secondary switch S4*s* and the sixth secondary switch S6*s*.

Figure 14:
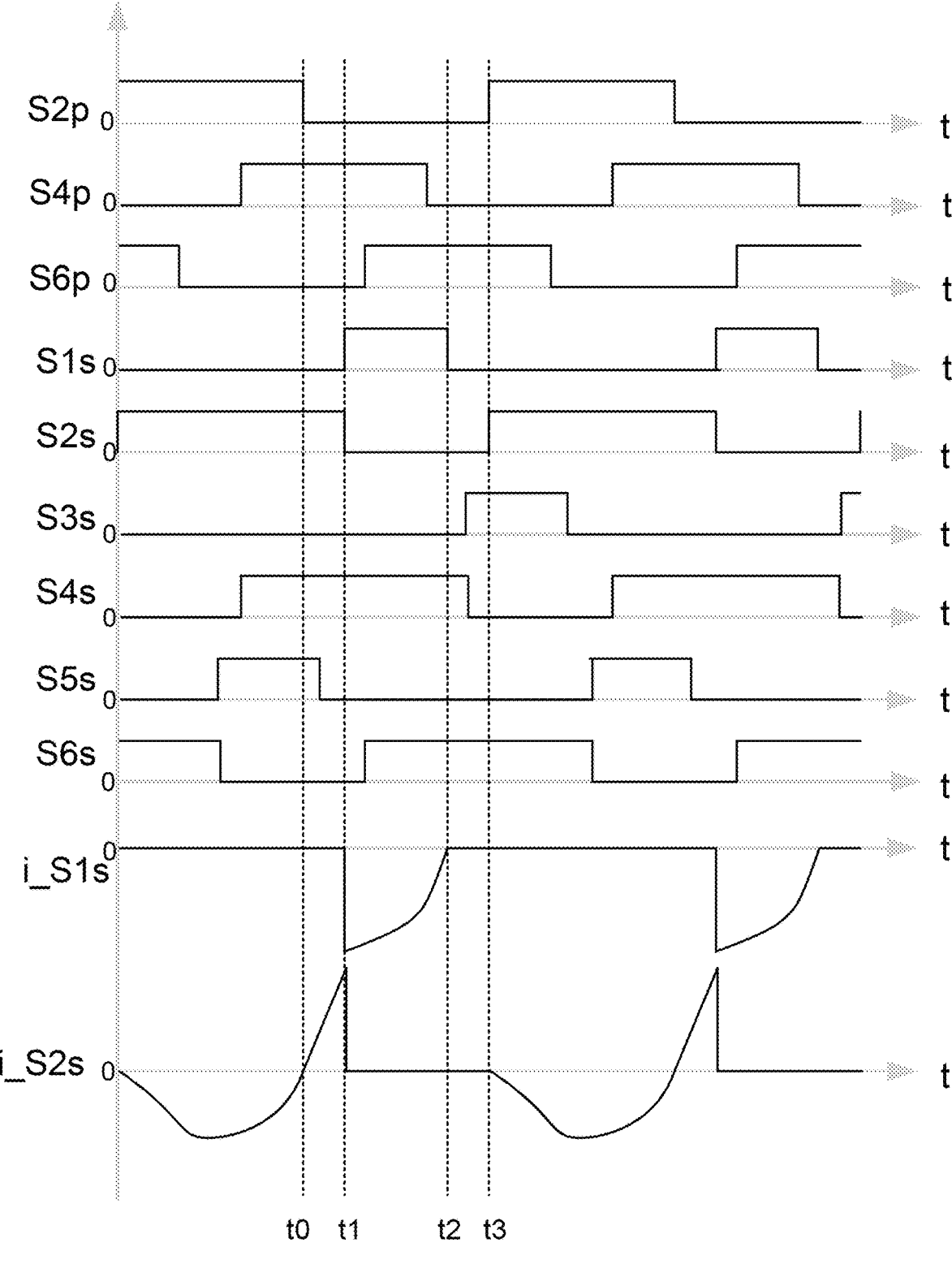
FIG. 14 is a diagram of another modulated pulse width modulation driving signal for the three-phase CLLC circuit with bidirectional power transmission.

FIG. 14 shows another modulation way of the three-phase CLLC circuit with bidirectional power transmission, i.e., in the second driving mode of this example, the difference from the above modulation way is that in the modulation way, a rising edge of the pulse width modulation driving signal for the second secondary switch S2*s* is the same as a rising edge of the pulse width modulation driving signal for the second primary switch S2*p*, and a falling edge of the pulse width modulation driving signal for the second secondary switch S2*s* corresponds to a rising edge of the pulse width modulation driving signal for the first secondary switch S1*s*, a duty cycle of the second secondary switch S2*s* is greater than 50%, and a duty cycle of the first secondary switch S1*s* is less than 50%. A rising edge of the pulse width modulation driving signal for the fourth secondary switch S4*s* is the same as a rising edge of the pulse width modulation driving signal for the fourth primary switch S4*p*, and a falling edge of the pulse width modulation driving signal for the fourth secondary switch S4*s* corresponds to a rising edge of the pulse width modulation driving signal for the third secondary switch S3*s*. A duty cycle of the fourth secondary switch S4*s* is greater than 50%, and a duty cycle of the third secondary switch S3*s* is less than 50%. A rising edge of the pulse width modulation driving signal for the sixth secondary switch S6*s* is the same as a rising edge of the pulse width modulation driving signal for the sixth primary switch S6*p*, and a falling edge of the pulse width modulation driving signal for the sixth secondary switch S6*s* corresponds to a rising edge of the pulse width modulation driving signal for the fifth secondary switch S5*s*. A duty cycle of the sixth secondary switch S6*s* is greater than 50%, and a duty cycle of the fifth secondary switch S5*s* is less than 50%. That is, the second driving mode of this example uses the modulation way shown in FIG. 14. As can be known, a total loss of the first secondary switch S1*s*, the third secondary switch S3*s* and the fifth secondary switch S5*s* is less than a total loss of the second secondary switch S2*s*, the fourth secondary switch S4*s* and the sixth secondary switch S6*s*.

In an alternative embodiment of the third example, in a first time window, the three-phase CLLC circuit with bidirectional power transmission is controlled to operate in the first driving mode, in a second time window, the three-phase CLLC circuit with bidirectional power transmission is controlled to operate in the second driving mode, and losses in different switches tend to balance using alternating switch of the first driving mode and the second driving mode corresponding to the first time window and the second time window respectively. Specifically, in an alternative embodiment of the third example, the first primary switch S1*p*, the second primary switch S2*p*, the third primary switch S3*p*, the fourth primary switch S4*p*, the fifth primary switch S5*p*, the sixth primary switch S6*p*, the first secondary switch S1*s*, the second secondary switch S2*s*, the third secondary switch S3*s*, the fourth secondary switch S4*s*, the fifth secondary switch S5*s* and the sixth secondary switch S6*s* of the three-phase CLLC circuit with bidirectional power transmission in the first driving mode and the second driving mode satisfy: the pulse width modulation driving signal for the first secondary switch S1*s* in the first driving mode is the same as the pulse width modulation driving signal for the second secondary switch S2*s* in the second driving mode, the pulse width modulation driving signal for the second secondary switch S2*s* in the first driving mode is the same as the pulse width modulation driving signal for the first secondary switch S1*s* in the second driving mode, the pulse width modulation driving signal for the third secondary switch S3*s* in the first driving mode is the same as the pulse width modulation driving signal for the fourth secondary switch S4*s* in the second driving mode, the pulse width modulation driving signal for the fourth secondary switch S4*s* in the first driving mode is the same as the pulse width modulation driving signal for the third secondary switch S3*s* in the second driving mode, the pulse width modulation driving signal for the fifth secondary switch S5*s* in the first driving mode is the same as the pulse width modulation driving signal for the sixth secondary switch S6s in the second driving mode, and the pulse width modulation driving signal for the sixth secondary switch S6s in the first driving mode is the same as the pulse width modulation driving signal for the fifth secondary switch S5s in the second driving mode; the pulse width modulation driving signal for the first primary switch S1p in the first driving mode is the same as the pulse width modulation driving signal for the second primary switch S2p in the second driving mode, the pulse width modulation driving signal for the second primary switch S2p in the first driving mode is the same as the pulse width modulation driving signal for the first primary switch S1p in the second driving mode, the pulse width modulation driving signal for the third primary switch S3p in the first driving mode is the same as the pulse width modulation driving signal for the fourth primary switch S4p in the second driving mode, the pulse width modulation driving signal for the fourth primary switch S4p in the first driving mode is the same as the pulse width modulation driving signal for the third primary switch S3p in the second driving mode, the pulse width modulation driving signal for the fifth primary switch S5p in the first driving mode is the same as the pulse width modulation driving signal for the sixth primary switch S6p in the second driving mode, and the pulse width modulation driving signal for the sixth primary switch S6p in the first driving mode is the same as the pulse width modulation driving signal for the fifth primary switch S5p in the second driving mode. In the first time window, the pulse width modulation driving signals for the bridge circuit when operating in the first driving mode, for example, may be achieved by swapping with the pulse width modulation driving signals for the first secondary switch S1s and the second secondary switch S2s in the second driving mode, swapping with the pulse width modulation driving signals for the third secondary switch S3s and the fourth secondary switch S4s in the second driving mode, swapping with the pulse width modulation driving signals for the fifth secondary switch S5s and the sixth secondary switch S6s in the second driving mode, swapping with the pulse width modulation driving signals for the first primary switch S1p and the second primary switch S2p in the second driving mode, swapping with the pulse width modulation driving signals for the third primary switch S3p and the fourth primary switch S4p in the second driving mode, and swapping with the pulse width modulation driving signals for the fifth primary switch S5p and the sixth primary switch Sop in the second driving mode. Alternatively, in the second time window, and controlling the bridge circuit to operate in the second driving mode, the pulse width modulation driving signals in the first driving mode are swapped in the above manner.

Figure 15:
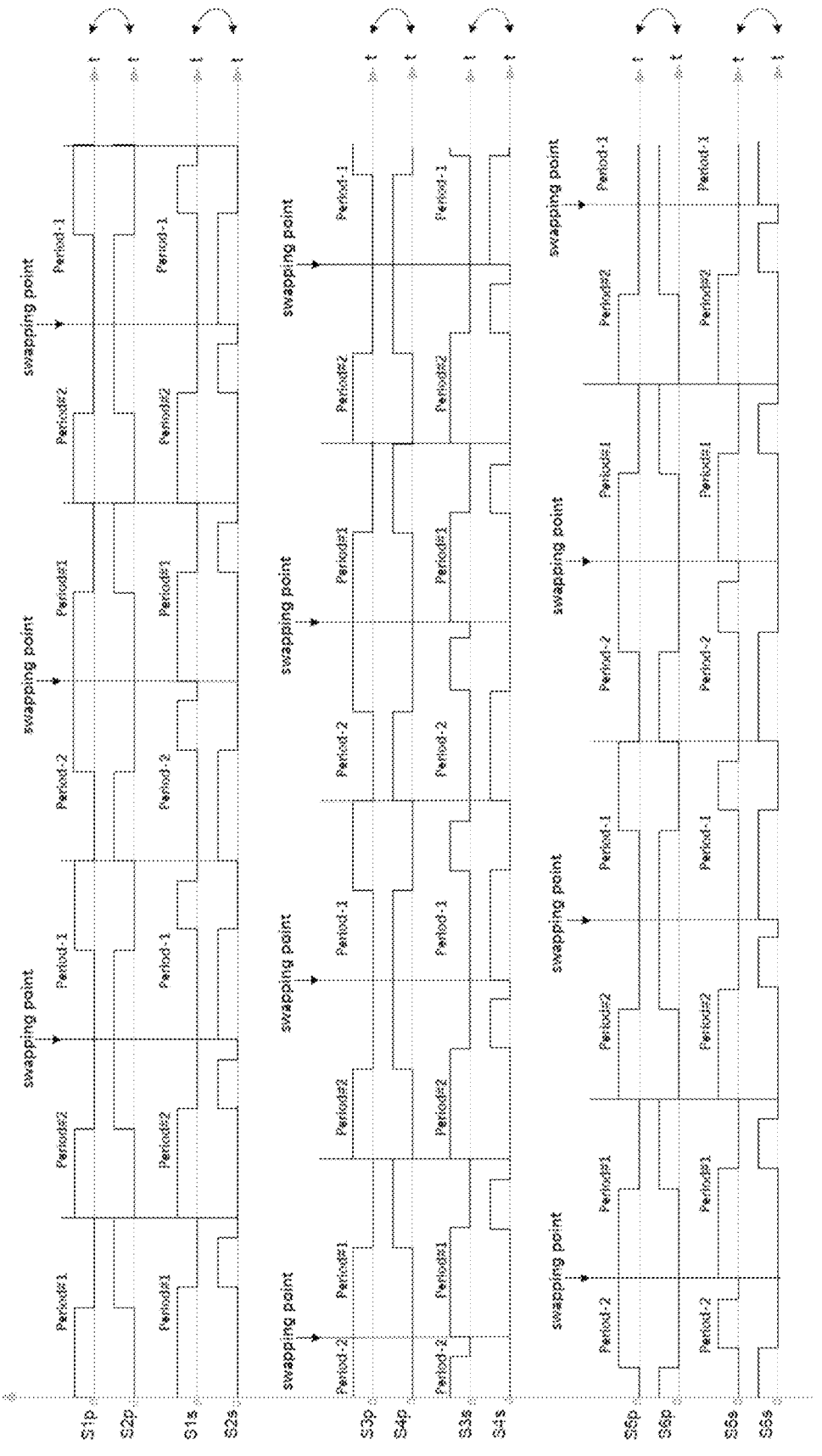
FIG. 15 is a signal waveform diagram of one embodiment where the pulse width modulation method according to an embodiment of the present disclosure is applied to the three-phase CLLC circuit with bidirectional power transmission when driving modes are switched.

As shown in FIG. 15, it shows pulse width modulation driving signal for each switch of primary inverter bridges S1p to Sop and secondary rectifier bridges S1s to S6s, where two switching cycles Period #1 and Period #2 are one first time window, two switching cycles Period-1 and Period-2 are one second time window, and M and N are both 2. That is, after passing two switching cycles, for example, the first driving mode and the second driving mode of the bridge circuit may be switched, the first driving mode is switched to the second driving mode, or the second driving mode is switched to the first driving mode. Specifically, for example, the pulse width modulation driving signals for the first secondary switch S1s and the second secondary switch S2s are swapped, the pulse width modulation driving signals for the third secondary switch S3s and the fourth secondary switch S4s are swapped, the pulse width modulation driving signals for the fifth secondary switch S5s and the sixth secondary switch S6s are swapped, the pulse width modulation driving signals for the first primary switch S1p and the second primary switch S2p are swapped, the pulse width modulation driving signals for the third primary switch S3p and the fourth primary switch S4p are swapped, and the pulse width modulation driving signals for the fifth primary switch S5p and the sixth primary switch S6p are swapped.

Since in the first driving mode, the total loss of the first secondary switch S1s, the third secondary switch S3s and the fifth secondary switch S5s is greater than the total loss of the second secondary switch S2s, the fourth secondary switch S4s and the sixth secondary switch S6s, and in the second driving mode, the total loss of the first secondary switch S1s, the third secondary switch S3s and the fifth secondary switch S5s is less than the total loss of the second secondary switch S2s, the fourth secondary switch S4s and the sixth secondary switch S6s, losses in the switches have reversal change in this example by swapping between the first driving mode and the second driving mode, so as time goes on, losses in the switches tend to be the same, such that all switches of the bridge circuit finally achieve thermal balance.

The present disclosure further provides a pulse width modulation system, which comprises a bridge circuit and a controller. The controller controls the bridge circuit to perform the pulse with modulation method shown in FIG. 1 and the relevant alternative embodiments. Specifically, the pulse width modulation system may include a bridge circuit and a controller, the controller controls the bridge circuit to perform: configuring a first driving mode and a second driving mode of the pulse width modulation of the bridge circuit, wherein losses of the same switch in the bridge circuit in the first driving mode and the second driving mode are reversed; in a first time window, controlling the bridge circuit to operate in the first driving mode, wherein the first time window is M switching cycles, and M is a positive integer; and in a second time window, controlling the bridge circuit to operate in the second driving mode, wherein the second time window is N switching cycles, and N is a positive integer, and wherein the pulse width modulation process of the bridge circuit is divided into the first time window and the second time window that are alternated cyclically. The specific control process and the achieved technical effects of the pulse width modulation system in this embodiment may be similar to those with respect to the corresponding part of the pulse width modulation method provided in the above embodiments. Accordingly, repeated description for the details of the process and effects are omitted here.

In conclusion, the pulse width modulation method and system according to the present disclosure use different driving modes among different time windows. By swapping the bridge circuit to operate in the corresponding driving mode in the specified time window, losses in devices of the switches are reversed when the driving modes are switched, thereby achieving thermal balance of all switches.

Of course, the present disclosure may further have various other embodiments, and those skilled in the art shall make various corresponding modifications and variations based on the present disclosure without departing from spirit and essence of the present disclosure, but these corresponding modifications and variations shall belong to the scope of protection of the appended claims.

What is claimed is:

1. A pulse width modulation method, which is applied to a bridge circuit, comprising:

configuring a first driving mode and a second driving mode of the pulse width modulation of the bridge circuit, wherein losses of a same switch in the bridge circuit in the first driving mode and the second driving mode are reversed;

in a first time window, controlling the bridge circuit to operate in the first driving mode, wherein the first time window is M switching cycles, and M is a positive integer; and in a second time window, controlling the bridge circuit to operate in the second driving mode, wherein the second time window is N switching cycles, and N is a positive integer, and wherein the pulse width modulation process of the bridge circuit is divided into the first time window and the second time window that are alternated cyclically.

2. The pulse width modulation method according to claim 1, wherein the M switching cycles of the first time window are equal to the N switching cycles of the second time window.

3. The pulse width modulation method according to claim 2, wherein M and N are both equal to 2.

4. The pulse width modulation method according to claim 1, wherein the bridge circuit is a series half bridge resonant circuit comprising an inverter bridge and a resonant tank, wherein the inverter bridge comprising an upper half bridge and a lower half bridge that are connected in series, the upper half bridge comprising a first bridge arm and a first capacitor, the first bridge arm comprising a first switch and a second switch that are sequentially connected in series, the first capacitor being connected in parallel to the first bridge arm; and the lower half bridge comprising a second bridge arm and a second capacitor, the second bridge arm comprising a third switch and a fourth switch that are sequentially connected in series, the second capacitor being connected in parallel to the second bridge arm, wherein, in the first driving mode and the second driving mode, a pulse width modulation driving signal for the first switch and a pulse width modulation driving signal for the second switch are complementary to each other, and a pulse width modulation driving signals for the third switch and a pulse width modulation driving signal for the fourth switch are complementary to each other, with a difference of 180° between a phase of the pulse width modulation driving signal for the first switch and a phase of the pulse width modulation driving signal for the third switch.

5. The pulse width modulation method according to claim 4, wherein a duty cycle of the first switch and a duty cycle of the third switch in the first driving mode are equal, defined as a first duty cycle, and a duty cycle of the first switch and a duty cycle of the third switch in the second driving mode are equal, defined as a second duty cycle, wherein the first duty cycle is less than 50%, and the second duty cycle is greater than 50%.

6. The pulse width modulation method according to claim 5, wherein the pulse width modulation driving signal for the first switch in the first driving mode is the same as the pulse width modulation driving signal for the second switch in the second driving mode, the pulse width modulation driving signal for the second switch in the first driving mode is the same as the pulse width modulation driving signal for the first switch in the second driving mode, the pulse width modulation driving signal for the third switch in the first driving mode is the same as the pulse width modulation driving signal for the fourth switch in the second driving mode, and the pulse width modulation driving signal for the fourth switch in the first driving mode is the same as the pulse width modulation driving signal for the third switch in the second driving mode.

7. The pulse width modulation method according to claim 5, wherein the pulse width modulation driving signal for the first switch in the first driving mode is the same as the pulse width modulation driving signal for the fourth switch in the second driving mode, the pulse width modulation driving signal for the fourth switch in the first driving mode is the same as the pulse width modulation driving signal for the first switch in the second driving mode, the pulse width modulation driving signal for the second switch in the first driving mode is the same as the pulse width modulation driving signal for the third switch in the second driving mode, and the pulse width modulation driving signal for the third switch in the first driving mode is the same as the pulse width modulation driving signal for the second switch in the second driving mode.

8. The pulse width modulation method according to claim 4, wherein the bridge circuit is a DC/DC conversion circuit, and further comprises a transformer, a rectifier circuit and an output capacitor, the resonant tank is electrically connected between the inverter bridge and a primary winding of the transformer, and the rectifier circuit is electrically connected between a secondary winding of the transformer and the output capacitor.

9. The pulse width modulation method according to claim 1, wherein the bridge circuit is a flying capacitor half bridge resonant circuit comprising an inverter bridge, a flying capacitor and a resonant tank, wherein the inverter bridge comprises an upper half bridge and a lower half bridge that are connected in series, the upper half bridge comprising a first bridge arm and a first capacitor, the first bridge arm comprising a first switch and a second switch that are sequentially connected in series, the first capacitor being connected in parallel to the first bridge arm, and the lower half bridge comprising a second bridge arm and a second capacitor, the second bridge arm comprising a third switch and a fourth switch that are sequentially connected in series, the second capacitor connected in parallel to the second bridge arm, wherein one end of the flying capacitor is connected to a connection point of the first switch and the second switch, and the other end of the flying capacitor is connected to a connection point of the third switch and the fourth switch, wherein in the first driving mode and the second driving mode, a pulse width modulation driving signal for the first switch and a pulse width modulation driving signal for the fourth switch are complementary to each other, and a pulse width modulation driving signal for the second switch and a pulse width modulation driving signal for the third switch are complementary to each other, with a difference of 180° between a phase of the pulse width modulation driving signal for the first switch and a phase of the pulse width modulation driving signal for the third switch.

10. The pulse width modulation method according to claim 9, wherein a duty cycle of the first switch and a duty cycle of the third switch in the first driving mode are equal, defined as a first duty cycle, and a duty cycle of the first switch and a duty cycle of the third switch in the second driving mode are equal, defined as a second duty cycle, wherein the first duty cycle is less than 50%, and the second duty cycle is greater than 50%.

11. The pulse width modulation method according to claim 10, wherein, the pulse width modulation driving signal for the first switch in the first driving mode is the same as the pulse width modulation driving signal for the fourth switch in the second driving mode, the pulse width modulation driving signal for the fourth switch in the first driving mode is the same as the pulse width modulation driving signal for the first switch in the second driving mode, the pulse width modulation driving signal for the second switch in the first driving mode is the same as the pulse width modulation driving signal for the third switch in the second driving mode, and the pulse width modulation driving signal for the third switch in the first driving mode is the same as the pulse width modulation driving signal for the second switch in the second driving mode.

12. The pulse width modulation method according to claim 10, wherein the pulse width modulation driving signal for the first switch in the first driving mode is the same as the pulse width modulation driving signal for the second switch in the second driving mode, the pulse width modulation driving signal for the second switch in the first driving mode is the same as the pulse width modulation driving signal for the first switch in the second driving mode, the pulse width modulation driving signal for the third switch in the first driving mode is the same as the pulse width modulation driving signal for the fourth switch in the second driving mode, and the pulse width modulation driving signal for the fourth switch in the first driving mode is the same as the pulse width modulation driving signal for the third switch in the second driving mode.

13. The pulse width modulation method according to claim 9, wherein the bridge circuit is a DC/DC conversion circuit, and further comprises a transformer, a rectifier circuit and an output capacitor, the resonant tank is electrically connected between the inverter bridge and a primary winding of the transformer, and the rectifier circuit is electrically connected between a secondary winding of the transformer and the output capacitor.

14. The pulse width modulation method according to claim 1, wherein the bridge circuit is a three-phase CLLC with bidirectional power transmission, and comprises a three-phase inverter bridge, a three-phase resonant network, and a three-phase rectifier bridge, wherein the three-phase inverter bridge comprises a first bridge arm, a second bridge arm and a third bridge arm connected in parallel, wherein the first bridge arm comprises a first primary switch and a second primary switch that are sequentially connected in series, the second bridge arm comprises a third primary switch and a fourth primary switch that are sequentially connected in series, and the third bridge arm comprises a fifth primary switch and a sixth primary switch that are sequentially connected in series, wherein the three-phase resonant network comprising a three-phase transformer, three primary resonant tanks and three secondary resonant tanks, wherein the three primary resonant tanks are connected to three primary windings of the three-phase transformer respectively, and the three secondary resonant tanks are connected to three secondary windings of the three-phase transformer respectively, wherein the three-phase rectifier bridge comprising a fourth bridge arm, a fifth bridge arm and a sixth bridge arm that are connected in parallel, wherein the fourth bridge arm comprises a first secondary switch and a second secondary switch that are sequentially connected in series, the fifth bridge arm comprises a third secondary switch and a fourth secondary switch that are sequentially connected in series, and the sixth bridge arm comprises a fifth secondary switch and a sixth secondary switch that are sequentially connected in series, wherein in the first driving mode and the second driving mode, a pulse width modulation driving signal for the first primary switch and a pulse width modulation driving signal for the second primary switch are complementary to each other, a pulse width modulation driving signal for the third primary switch and a pulse width modulation driving signal for the fourth primary switch are complementary to each other, and a pulse width modulation driving signal for the fifth primary switch and a pulse width modulation driving signal for the sixth primary switch are complementary to each other, wherein a duty cycle of the primary switches in the three-phase inverter bridge is 50%, phases of pulse width modulation driving signals for the first primary switch, the third primary switch and the fifth primary switch are sequentially different by 120°, phases of pulse width modulation driving signals for the first secondary switch, the third secondary switch and the fifth secondary switch are sequentially different by 120°, and phases of pulse width modulation driving signals for the second secondary switch, the fourth secondary switch and the sixth secondary switch are sequentially different by 120°.

15. The pulse width modulation method according to claim 14, wherein in the first driving mode, duty cycles of the pulse width modulation driving signals for the first secondary switch, the third secondary switch and the fifth secondary switch are greater than 50%, duty cycles of the pulse width modulation driving signals for the second secondary switch, the fourth secondary switch and the sixth secondary switch are less than 50%, wherein a rising edge of the pulse width modulation driving signal for the first secondary switch is the same as a rising edge of the pulse width modulation driving signal for the first primary switch, and a falling edge of the pulse width modulation driving signal for the first secondary switch corresponds to a rising edge of the pulse width modulation driving signal for the second secondary switch;

a rising edge of the pulse width modulation driving signal for the third secondary switch is the same as a rising edge of the pulse width modulation driving signal for the third primary switch, and a falling edge of the pulse width modulation driving signal for the third secondary switch corresponds to a rising edge of the pulse width modulation driving signal for the fourth secondary switch;

a rising edge of the pulse width modulation driving signal for the fifth secondary switch is the same as a rising edge of the pulse width modulation driving signal for the fifth primary switch, and a falling edge of the pulse width modulation driving signal for the fifth secondary switch corresponds to a rising edge of the pulse width modulation driving signal for the sixth secondary switch.

16. The pulse width modulation method according to claim 14, wherein in the second driving mode, duty cycles of the pulse width modulation driving signals for the first secondary switch, the third secondary switch and the fifth secondary switch are less than 50%, and duty cycles of the pulse width modulation driving signals for the second secondary switch, the fourth secondary switch and the sixth secondary switch are greater than 50%, wherein a rising edge of the pulse width modulation driving signal for the second secondary switch is the same as a rising edge of the pulse width modulation driving signal for the second primary switch, and a falling edge of the pulse width modulation driving signal for the second secondary switch corresponds to a rising edge of the pulse width modulation driving signal for the first secondary switch;

a rising edge of the pulse width modulation driving signal for the fourth secondary switch is the same as a rising edge of the pulse width modulation driving signal for the fourth primary switch, and a falling edge of the pulse width modulation driving signal for the fourth secondary switch corresponds to a rising edge of the pulse width modulation driving signal for the third secondary switch;

a rising edge of the pulse width modulation driving signal for the sixth secondary switch is the same as a rising edge of the pulse width modulation driving signal for the sixth primary switch, and a falling edge of the pulse width modulation driving signal for the sixth secondary switch corresponds to a rising edge of the pulse width modulation driving signal for the fifth secondary switch.

17. The pulse width modulation method according to claim 14, wherein the pulse width modulation driving signal for the first secondary switch in the first driving mode is the same as the pulse width modulation driving signal for the second secondary switch in the second driving mode, the pulse width modulation driving signal for the second secondary switch in the first driving mode is the same as the pulse width modulation driving signal for the first secondary switch in the second driving mode, the pulse width modulation driving signal for the third secondary switch in the first driving mode is the same as the pulse width modulation driving signal for the fourth secondary switch in the second driving mode, the pulse width modulation driving signal for the fourth secondary switch in the first driving mode is the same as the pulse width modulation driving signal for the third secondary switch in the second driving mode, the pulse width modulation driving signal for the fifth secondary switch in the first driving mode is the same as the pulse width modulation driving signal for the sixth secondary switch in the second driving mode, and the pulse width modulation driving signal for the sixth secondary switch in the first driving mode is the same as the pulse width modulation driving signal for the fifth secondary switch in the second driving mode;

the pulse width modulation driving signal for the first primary switch in the first driving mode is the same as the pulse width modulation driving signal for the second primary switch in the second driving mode, the pulse width modulation driving signal for the second primary switch in the first driving mode is the same as the pulse width modulation driving signal for the first primary switch in the second driving mode, the pulse width modulation driving signal for the third primary switch in the first driving mode is the same as the pulse width modulation driving signal for the fourth primary switch in the second driving mode, the pulse width modulation driving signal for the fourth primary switch in the first driving mode is the same as the pulse width modulation driving signal for the third primary switch in the second driving mode, the pulse width modulation driving signal for the fifth primary switch in the first driving mode is the same as the pulse width modulation driving signal for the sixth primary switch in the second driving mode, and the pulse width modulation driving signal for the sixth primary switch in the first driving mode is the same as the pulse width modulation driving signal for the fifth primary switch in the second driving mode.

18. A pulse width modulation system, comprising a bridge circuit and a controller, wherein the controller configures a first driving mode and a second driving mode of the pulse width modulation of the bridge circuit, wherein losses of a same switch in the bridge circuit in the first driving mode and the second driving mode are reversed;

in a first time window, controls the bridge circuit to operate in the first driving mode, wherein the first time window is M switching cycles, and M is a positive integer; and in a second time window, controls the bridge circuit to operate in the second driving mode, wherein the second time window is N switching cycles, and N is a positive integer, and wherein the pulse width modulation process of the bridge circuit is divided into the first time window and the second time window that are alternated cyclically.

* * * * *